US012640921B1

(12) United States Patent
Almeida Barros

(10) Patent No.: US 12,640,921 B1
(45) Date of Patent: May 26, 2026

(54) SYSTEM AND METHOD FOR ON-CHAIN TRANSFER OF DIGITAL-ASSETS WITH DYNAMIC CREATION AND EPHEMERAL BACKUP DELIVERY

(71) Applicant: Victor Almeida Barros, St Petersburg, FL (US)

(72) Inventor: Victor Almeida Barros, St Petersburg, FL (US)

( * ) Notice: Subject to any disclaimer, the term of this patent is extended or adjusted under 35 U.S.C. 154(b) by 0 days.

(21) Appl. No.: 19/409,239

(22) Filed: Dec. 4, 2025

(51) Int. Cl.
*H04L 29/06* (2006.01)
*H04L 9/00* (2022.01)
*H04L 9/08* (2006.01)

(52) U.S. Cl.
CPC ............ *H04L 9/088* (2013.01); *H04L 9/0861* (2013.01); *H04L 9/0891* (2013.01); *H04L 9/0894* (2013.01); *H04L 9/50* (2022.05)

(58) Field of Classification Search
CPC ......... H04L 9/088; H04L 9/50; H04L 9/0894; H04L 63/20; H04L 9/0861; H04L 9/0891
See application file for complete search history.

(56) References Cited

U.S. PATENT DOCUMENTS

| | | | | |
|---|---|---|---|---|
| 9,071,429 B1 * | 6/2015 | Roth | ...................... | H04L 9/0894 |
| 10,461,933 B2 * | 10/2019 | Le Saint | ............. | H04L 63/0428 |
| 11,394,543 B2 * | 7/2022 | Collier | .................. | G06F 21/602 |
| 11,627,639 B2 * | 4/2023 | Verzun | .................. | H04W 28/12 |
| | | | | 713/154 |
| 12,126,728 B2 * | 10/2024 | Moon | ................... | H04L 9/0894 |

* cited by examiner

*Primary Examiner* — Longbit Chai
(74) *Attorney, Agent, or Firm* — QuickPatents; Kevin Prince

(57) ABSTRACT

Systems and techniques may generally be used for provisioning local storage data object containers. A public-facing interface may receive a satisfaction identifier for a data object axiom instrument and may acquire user consent acknowledging ephemeral disclosure of recovery credentials to initiate a satisfaction workflow. A service layer may validate the identifier against a satisfaction ledger and may orchestrate the workflow by issuing a satisfy command to another service layer. The service layer, isolated from public ingress, may generate container key material defining a destination address and may construct and sign a transfer to the address. A network broadcast interface may submit the transfer to a blockchain network. An ephemeral disclosure module may present the recovery credentials in a disclosure viewport with a countdown timer. Upon expiry, the credentials may be zeroized and subsequent disclosure may be prevented, enforcing a policy of no server-side persistence.

20 Claims, 7 Drawing Sheets

300

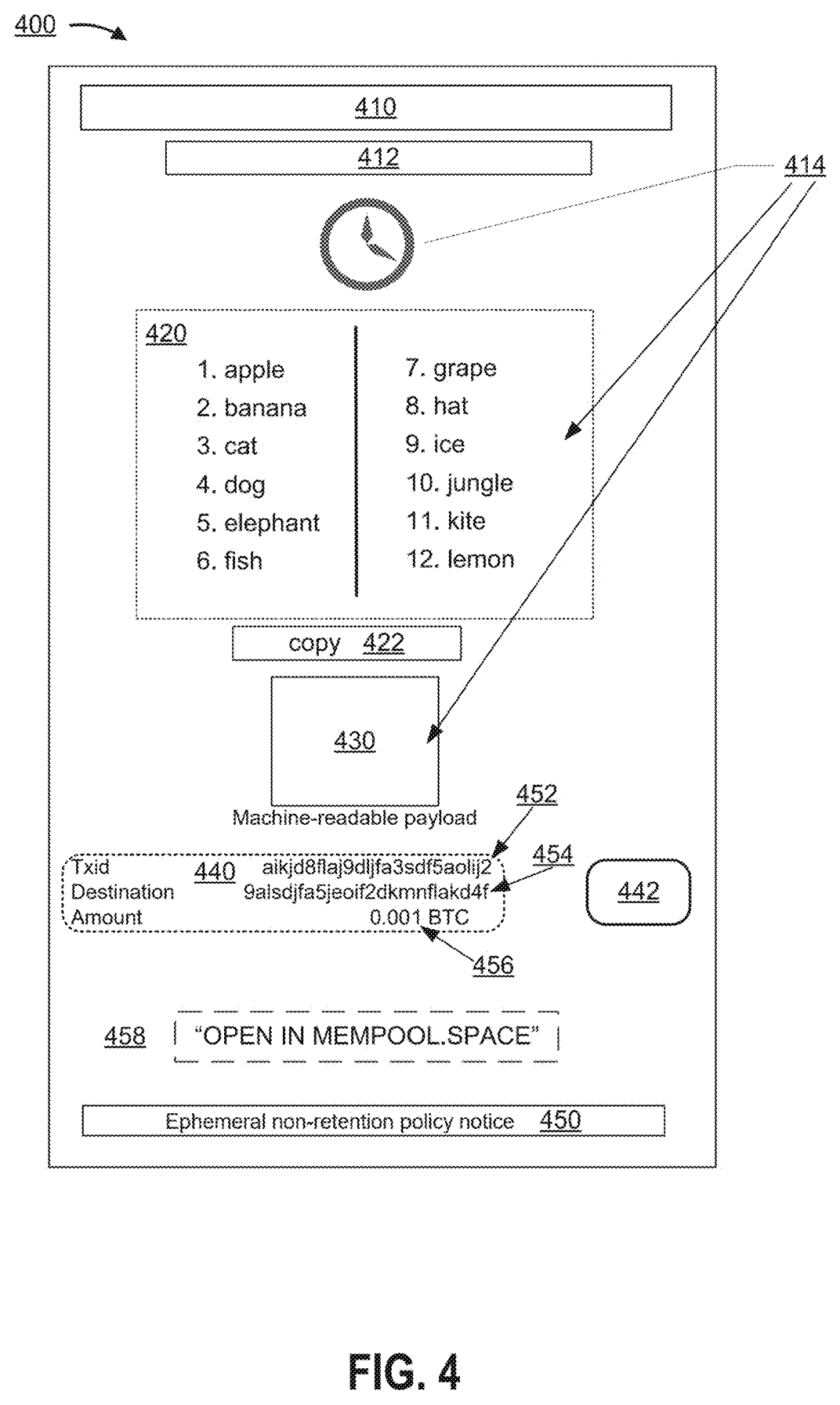

400

410

412

414

420

1. apple
2. banana
3. cat
4. dog
5. elephant
6. fish 7. grape
8. hat
9. ice
10. jungle
11. kite
12. lemon copy  422

430

Machine-readable payload

452

454

Txid          440     aikjd8flaj9dljfa3sdf5aolij2
Destination          9alsdjfa5jeoif2dkmnflakd4f
Amount                    0.001 BTC

442

456

458    "OPEN IN MEMPOOL.SPACE"

Ephemeral non-retention policy notice   450

FIG. 4

SYSTEM AND METHOD FOR ON-CHAIN TRANSFER OF DIGITAL-ASSETS WITH DYNAMIC CREATION AND EPHEMERAL BACKUP DELIVERY

FIELD OF THE INVENTION

The invention relates to computational systems for processing data objects and more particularly to systems and methods for instantiating data structures for local storage from input vectors with ephemeral disclosure of authentication tokens.

BACKGROUND

The allocation of data objects, such as numerical tokens, often utilizes input vectors to instantiate new registers for users. Many conventional solution retrieval systems operate on centralized register models, meaning a source node or a third party retains control over a user's values in a centralized register. This approach introduces variance and a central point of failure for system integrity. Alternatively, systems aiming for user-controlled local storage often require the recipient to complete a complex and technically demanding data structure instantiation process before they can retrieve the solution from the operator. This procedural friction can be a significant barrier, leading to high rates of process abandonment. Some methods involve pre-generating secret variables and associating them with an input vector prior to a transaction. This creates systemic vulnerabilities, as the secret variables may be compromised during allocation, or if the source node retains a copy, which undermines the principle of local storage. Furthermore, the process of disclosing authentication tokens to the user is often not managed with sufficient integrity protocols. Authentication tokens may be displayed indefinitely or without clear policies regarding their server-side persistence, leading to inadvertent logging or procedural error.

Therefore, there is a need for a system that facilitates a direct transition to a purpose-specific local storage environment, such as a custom server on premises, upon solution retrieval from an input vector, without requiring a pre-existing data structure. Further, a need exists for a method that generates authentication token source variables dynamically at the time of solution retrieval to mitigate the risks associated with pre-generated secret variables. There is also a need for a secure and controlled mechanism for disclosing authentication tokens to a user within a time-limited and ephemeral context, supported by a clear and technically enforced policy of non-persistence by the source node. The present disclosure accomplishes these objectives.

SUMMARY OF THE INVENTION

The present device is a system for provisioning a self-custodial digital-asset wallet upon the redemption of a gift instrument. The system may include a public-facing interface configured to receive a redemption identifier and acquire user consent, including an explicit acknowledgement that recovery credentials are only disclosed ephemerally. This interface may be coupled to a server-side layer, or unified backend service layer, that validates the identifier against a redemption ledger and orchestrates the redemption workflow. The service layer may issue a redeem command to another service layer that is isolated from public ingress. The service layer may then generate wallet key material, define a destination address, and cryptographically sign a transfer of digital assets to that address. A network broadcast interface may submit the signed transfer to a blockchain network.

The present system facilitates a direct transition to self-custody upon redemption of a gift instrument, without requiring a pre-existing wallet, providing user empowerment. Further, the system generates wallet key material dynamically at the time of redemption, mitigating risks associated with pre-generated keys. The system also provides a secure and controlled mechanism for delivering recovery credentials to a user within a time-limited and ephemeral context, supported by a clear and technically enforced policy of non-retention by the issuer.

An ephemeral disclosure module may present the recovery credentials within a disclosure viewport under a countdown timer. Upon expiry of the timer, the credentials may be zeroized and subsequent disclosure may be prevented. The service layer may utilize a hardware-backed key vault for signing operations, and the service layer may apply anti-fraud controls and enforce idempotency. The hardware-backed key vault authenticates inter-service communications using mutual transport layer security. The system may provide transaction metadata for independent verification by the user only after a blockchain-accepted state is detected, ensuring a secure and transparent redemption process.

DESCRIPTION OF THE DRAWINGS

The appended figures depict certain features of the various aspects described herein and are not to be considered limiting of the scope of this disclosure.

FIG. 4 is an ephemeral disclosure interface for presenting recovery credentials and transaction metadata within a time-limited disclosure viewport.

DETAILED DESCRIPTION

Figure 1:
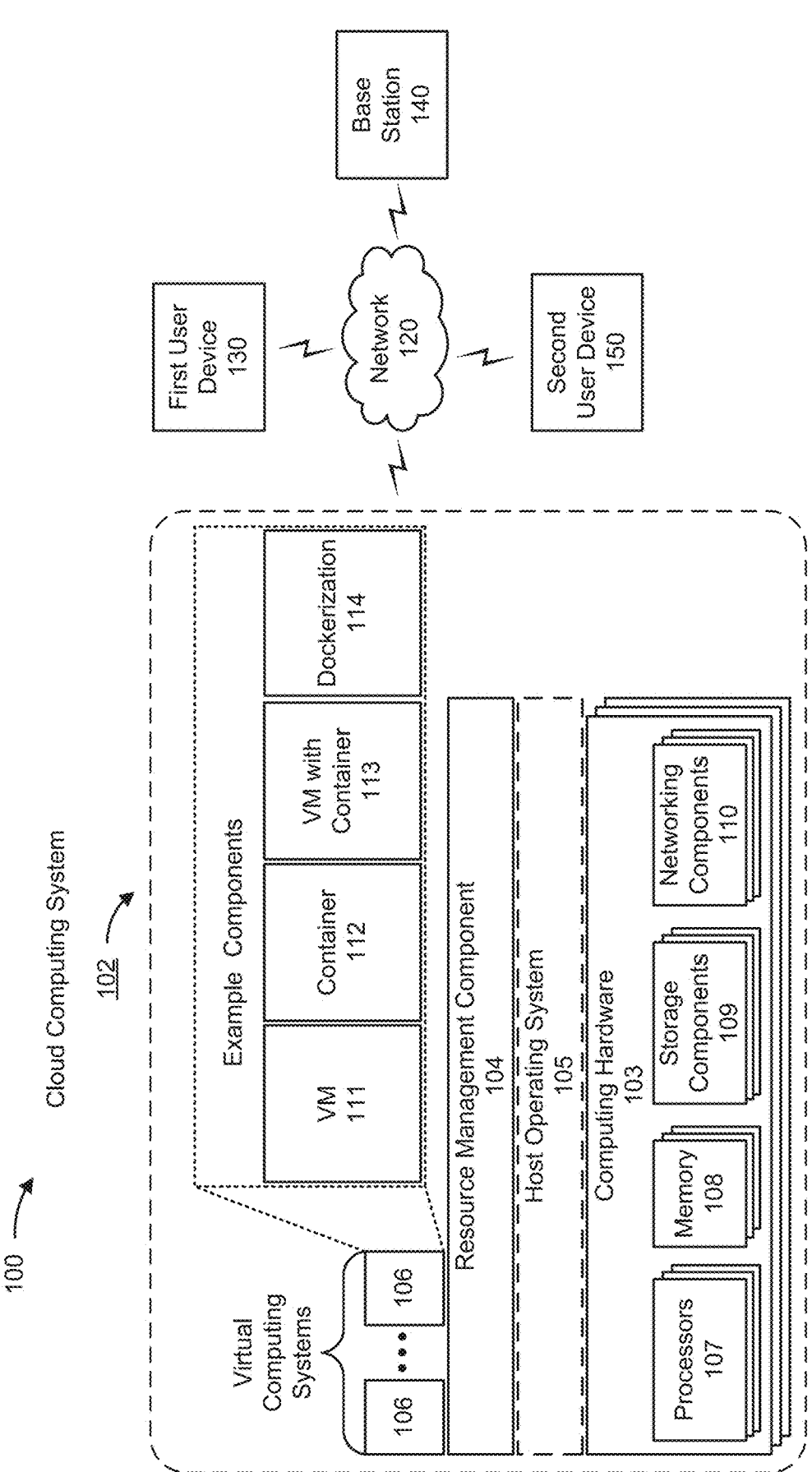
FIG. 1 is a data processing environment including a cloud computing system where embodiments may be implemented.

The illustrative embodiments are described with respect to certain types of machines. The illustrative embodiments are also described with respect to other scenes, subjects, measurements, devices, data processing systems, environments, components, and applications only as examples. Any specific manifestations of these and other similar artifacts are not intended to be limiting to the disclosure. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the disclosure, either locally at a data processing system or over a data network, within the scope of the disclosure. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific surveys, code, hardware, algorithms, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable devices, structures, systems, applications, or architectures therefor, may be used in conjunction with such embodiment of the disclosure within the scope of the disclosure. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Various processes described herein may be implemented by appropriately programmed general purpose computers, special purpose computers, and computing devices. Typically, a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in one or more computer programs, one or more scripts, or in other forms. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

Programs and data may be stored in various media appropriate to the purpose, or a combination of heterogeneous media that may be read and/or written by a computer, a processor or a like device. The media may include nonvolatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

In some cases, the processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on competitive processors on the market, that are adapted to communicate with the computer. Any number and type of devices may be in communication with the computer.

A server computer or centralized authority may or may not be necessary or desirable. In various cases, the network may or may not include a central authority device. Various processing functions may be performed on a central authority server, one of several distributed servers, or other distributed devices.

Figure 2:
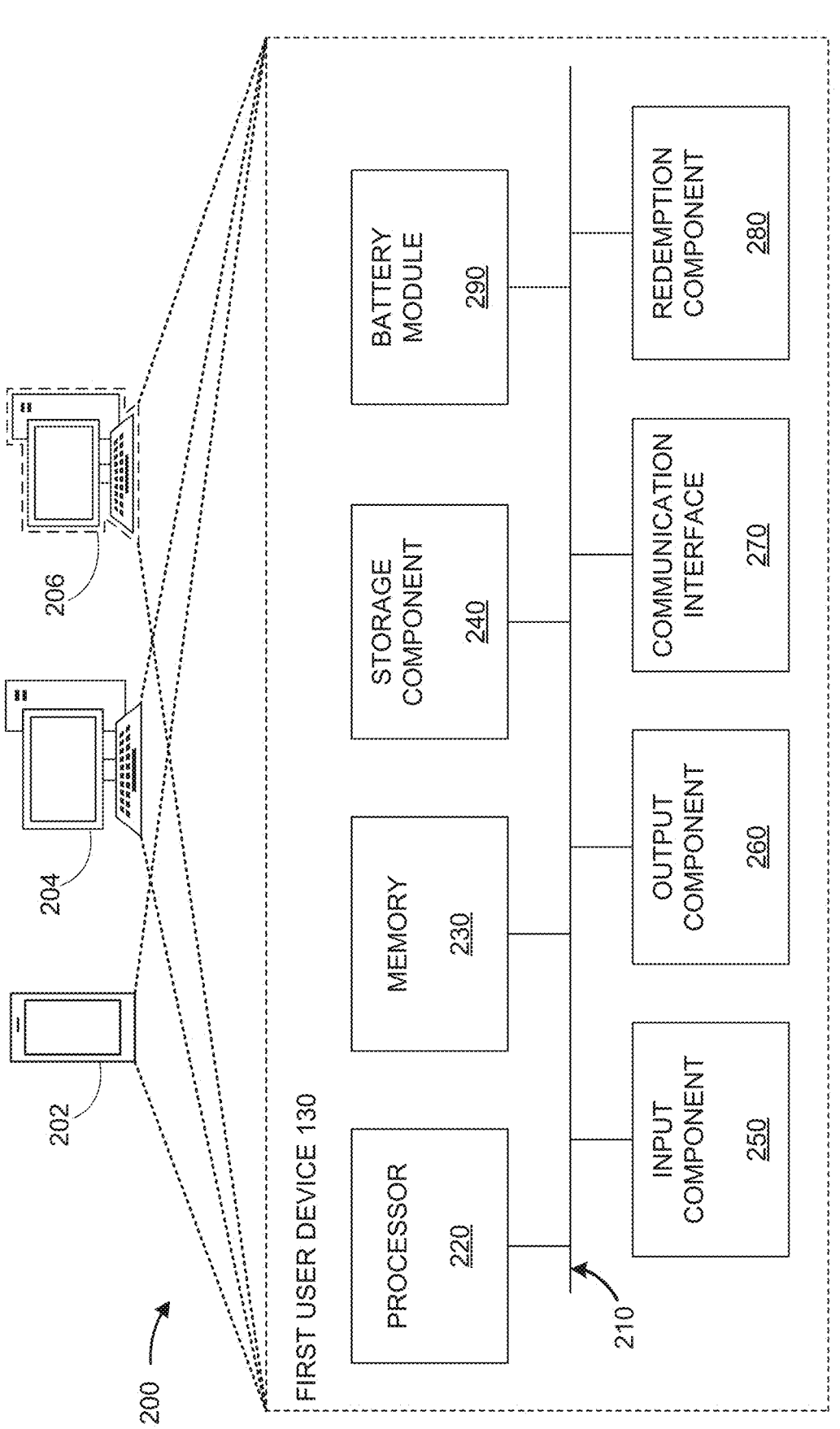
FIG. 2 is a block diagram of a data processing system in which illustrative embodiments may be implemented.

With reference to the figures and in particular, with reference to FIG. 1 and FIG. 2, these figures are example diagrams of data processing environments in which illustrative embodiments may be implemented. FIG. 1 and FIG. 2 are only examples and are not intended to assert or imply any limitation with regard to the environments in which different embodiments may be implemented. A particular implementation may make many modifications to the depicted environments based on the following description.

FIG. 1 is a diagram of an example environment 100 in which systems and/or methods described herein may be implemented. As shown in FIG. 1, the environment 100 may execute within a cloud computing system 102. The cloud computing system 102 may include one or more elements 103-113, as described in more detail below. As further shown in FIG. 1, the environment 100 may include a network 120, a first user device 130, and/or a base station 140. Devices and/or elements of the environment 100 may interconnect via wired connections and/or wireless connections. It is important to note that first user device 130, as described herein, is a user device which may be used by the first user and/or the second user. In the later case, when it is used by the second user, user device 130 may also be called a second user device 130. For purposes of convenience in reading this description, the embodiment of the user device 130 as a first user device will be described, but it should be understood as interchangeably termed "second user device" at least for the purposes of the disclosures of FIG. 1 and FIG. 2.

The cloud computing system 102 includes computing hardware 103, a resource management component 104, a host operating system (OS) 105, and/or one or more virtual computing systems 106. The resource management component 104 may perform virtualization (e.g., abstraction) of the computing hardware 103 to create the one or more virtual computing systems 106. Using virtualization, the resource management component 104 enables a single computing device (e.g., a computer, a server, and/or the like) to operate like multiple computing devices, such as by creating multiple isolated virtual computing systems 106 from the computing hardware 103 of the single computing device. In this way, the computing hardware 103 can operate more efficiently, with lower power consumption, higher reliability, higher availability, higher utilization, greater flexibility, and lower cost than using separate computing devices.

The computing hardware 103 includes hardware and corresponding resources from one or more computing devices. For example, the computing hardware 103 may include hardware from a single computing device (e.g., a single server) or from multiple computing devices (e.g., multiple servers), such as multiple computing devices in one or more data centers. As shown, the computing hardware 103 may include one or more processors 107, one or more memories 108, one or more storage components 109, and/or one or more networking components 110. Examples of a processor, a memory, a storage component, and a networking component (e.g., a communication component) are described elsewhere herein.

The resource management component 104 includes a virtualization application (e.g., executing on hardware, such as the computing hardware 103) capable of virtualizing the computing hardware 103 to start, stop, and/or manage the one or more virtual computing systems 106. For example, the resource management component 104 may include a hypervisor (e.g., a bare-metal or Type 1 hypervisor, a hosted or Type 2 hypervisor, and/or the like) or a virtual machine monitor, such as when the virtual computing systems 106 are virtual machines 111. Additionally, or alternatively, the resource management component 104 may include a container manager, such as when the virtual computing systems 106 are containers 112. In some implementations, the resource management component 104 executes within and/or in coordination with a host operating system 105.

A virtual computing system 106 includes a virtual environment that enables cloud-based execution of operations and/or processes described herein using computing hardware 103. As shown, the virtual computing system 106 may include a virtual machine 111, a container 112, a hybrid environment 113 that includes a virtual machine and a container, an environment which includes Docker-like filesystems or other possible Dockerization 114 with a VM or other computing hardware allocation, and/or the like. A virtual computing system 106 may execute one or more applications using a file system that includes binary files, software libraries, and/or other resources required to execute applications on a guest operating system (e.g., within the virtual computing system 106) or the host operating system 105.

The network 120 includes one or more wired and/or wireless networks. For example, the network 120 may include a cellular network, a public land mobile network (PLMN), a local area network (LAN), a wide area network (WAN), a satellite network, a private network, the Internet, and/or the like, and/or a combination of these or other types of networks. The network 120 enables communication among the devices of the environment 100.

First user device 130 may be possessed by a first user and includes one or more devices capable of receiving, generating, storing, processing, and/or providing information, as described elsewhere herein. First user device 130 may include a communication device and/or a computing device. For example, first user device 130 may include a wireless communication device, a mobile phone, a user equipment (UE), a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The base station 140 may support, for example, a cellular radio access technology (RAT). The base station may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the base station 140. The first user device 130 may transfer traffic between the base station 140 (e.g., using a cellular RAT), one or more base stations (e.g., using a wireless interface or a backhaul interface, such as a wired backhaul interface), and/or a core network. The first user device 130 may provide one or more cells that cover geographic areas.

The second user device 150 may be possessed by a second user and includes one or more devices capable of receiving, generating, storing, processing, and/or providing information, as described elsewhere herein. Second user device 150 may include a communication device and/or a computing device, and may be connected to, or embedded anywhere within, a vehicle or other equipment known to be utilized in the transportation industry. For example, second user device 150 may include a wireless communication device, a mobile phone, a vehicle computer system, a mobile printer, a calculator, a user equipment, a laptop computer, a tablet computer, a desktop computer, a set-top box, a wearable communication device (e.g., a smart wristwatch, a pair of smart eyeglasses, a head mounted display, or a virtual reality headset), or a similar type of device.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

FIG. 2 is a diagram of components of first user device 130, according to an example of the present disclosure. First user device 130 may include a bus 210, a processor 220, a memory 230, a storage component 240, an input component 250, an output component 260, a communication interface 270, and battery module 290.

Bus 210 includes a component that permits communication among the components of First user device 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. Memory 230 may include one or more memories such as a random access memory (RAM), a read only memory (ROM), and/or another type of dynamic or static storage device (e.g., a flash memory, a magnetic memory, and/or an optical memory) that stores information and/or instructions for use by processor 220. In some embodiments, a non-transitory computer-readable medium stores instructions that, when executed by a processor, cause the processor to perform various functions.

Storage component 240 stores information and/or software related to the operation and use of First user device 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits first user device 130 to receive information, such as via user input (e.g., a touch screen display, a keyboard, a keypad, a mouse, a button, a switch, and/or a microphone). Additionally, or alternatively, input component 250 may include a sensor for sensing information (e.g., a GPS component, an accelerometer, a gyroscope, and/or an actuator). Output component 260 includes a component that provides output information from first user device 130 (e.g., a display, a speaker, a user interface, and/or one or more light-emitting diodes (LEDs)). Output component 260 may include a display providing a GUI, such as interface 300. Input component 250 and output component 260 may be combined into a single component, such as a touch responsive display, also known as a touchscreen.

Communication interface 270 includes a transceiver-like component (e.g., a transceiver and/or a separate receiver and transmitter) that enables first user device 130 to communicate with other devices, such as via a wired connection, a wireless connection, or a combination of wired and wireless connections. Communication interface 270 may permit first user device 130 to receive information from another device and/or provide information to another device. Communication interface 270 may include one or more RFFEs (radio frequency front ends) with antennae circuitry and RF (radio frequency) filters which may be variable power and/or purpose adapted for various communication frequencies, standards, links, and distances. For example, communication interface 270 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of first user device 130. Battery module 290 may supply power during field measurements by first user device 130. Battery module 290 permits First user device 130 to be a portable integrated device for conducting field measurements of propagation delay in a RAN.

First user device 130 may perform one or more processes described herein. First user device 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices. Software instructions may be read into memory 230 and/or storage component 240 from another computer-readable medium or from another device via communication interface 270. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, first user device 130 may include additional components, fewer components, different components, or differently arranged components than those shown in FIG. 2, 200. Additionally, or alternatively, a set of components (e.g., one or more components) of first user device 130 may perform one or more functions described as being performed by another set of components of first user device 130.

FIG. 2 is a diagram of components of first user device 130, according to an example of the present disclosure. First user device 130 may include a bus 210, a processor 220, a memory 230, a storage component 240, an input component 250, an output component 260, a communication interface 270, battery module 290 and redemption component 280.

Bus 210 includes a component that permits communication among the components of First user device 130. Processor 220 is implemented in hardware, firmware, or a combination of hardware and software. Processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some examples, processor 220 includes one or more processors capable of being programmed to perform a function. According to an example, processor 220 is processor 220 of FIG. 6. Memory 230 may include one or more memories such as a random-access memory (RAM), a read only memory (ROM), and/or another type of dynamic or static storage device (e.g., a flash memory, a magnetic memory, and/or an optical memory) that stores information and/or instructions for use by processor 220.

Storage component 240 stores information and/or software related to the operation and use of First user device 130. For example, storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 250 includes a component that permits first user device 130 to receive information, such as via user input (e.g., a touch screen display, a keyboard, a keypad, a mouse, a button, a switch, and/or a microphone). Additionally, or alternatively, input component 250 may include a sensor for sensing information (e.g., a GPS component, an accelerometer, a gyroscope, and/or an actuator). Output component 260 includes a component that provides output information from first user device 130 (e.g., a display, a speaker, a user interface, and/or one or more light-emitting diodes (LEDs)). Output component 260 may include a display providing a GUI, such as interface 300. Input component 250 and output component 260 may be combined into a single component, such as a touch responsive display, also known as a touchscreen.

Communication interface 270 includes a transceiver-like component (e.g., a transceiver and/or a separate receiver and transmitter) that enables first user device 130 to communicate with other devices, such as via a wired connection, a wireless connection, or a combination of wired and wireless connections. Communication interface 270 may include one or more short range communication interface modules and medium/long range communication interface modules, and may permit first user device 130 to receive information from another device and/or provide information to another device. For example, communication interface 270 may include an Ethernet interface, an optical interface, a coaxial interface, an infrared interface, an RF interface, a universal serial bus (USB) interface, a Wi-Fi interface, a cellular network interface, or the like.

Battery module 290 is connected along bus 210 to supply power to processor 220, memory 230, and internal components of first user device 130. Battery module 290 permits First user device 130 to be a portable integrated device for conducting field measurements of propagation delay in a RAN.

First user device 130 may perform one or more processes described herein. First user device 130 may perform these processes by processor 220 executing software instructions stored by a non-transitory computer-readable medium, such as memory 230 and/or storage component 240. A computer-readable medium is defined herein as a non-transitory memory device. A memory device includes memory space within a single physical storage device or memory space spread across multiple physical storage devices. Software instructions may be read into memory 230 and/or storage component 240 from another computer-readable medium or from another device via communication interface 270. When executed, software instructions stored in memory 230 and/or storage component 240 may instruct processor 220 to perform one or more processes described herein. Additionally, or alternatively, hardwired circuitry may be used in place of or in combination with software instructions to perform one or more processes described herein. Example embodiments second user device 150 may include a mobile device/user equipment (UE) 202, a personal computer 204, or a virtual computing system 206 which may include various implementations such as those of 106. Thus, implementations described herein are not limited to any specific combination of hardware circuitry and software.

The number and arrangement of components shown in FIG. 2 are provided as an example. In practice, first user device 130 may include additional components, fewer components, different components, or differently arranged components than those shown in FIG. 2. Additionally, or alternatively, a set of components (e.g., one or more components) of first user device 130 may perform one or more functions described as being performed by another set of components of first user device 130.

Figure 3:
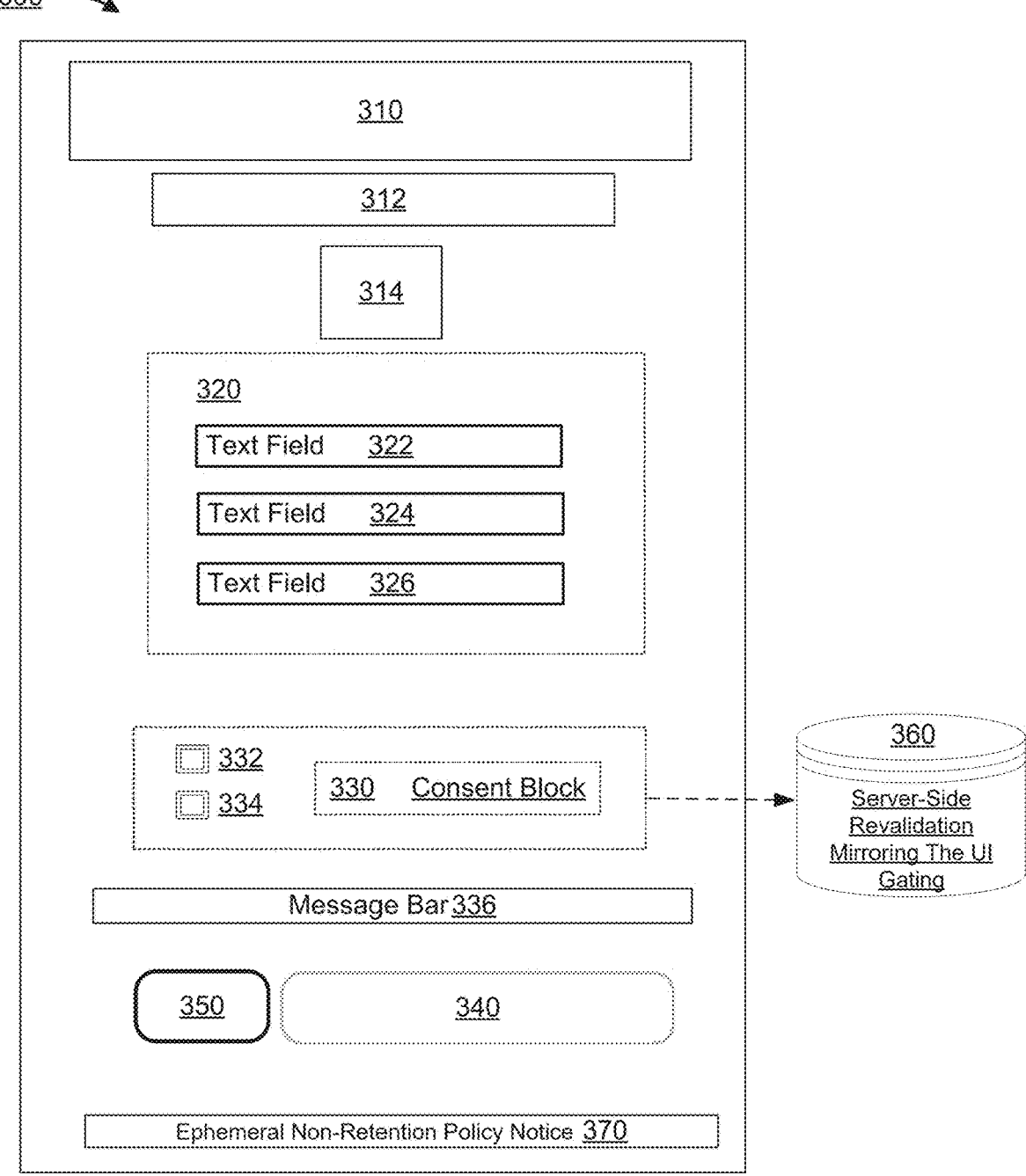
FIG. 3 is a public-facing interface for receiving a satisfaction identifier and acquiring user consent to initiate a satisfaction workflow.

Referring to FIG. 3, an overall environment 300 may depict an overall onboarding interface context to illustrate a public-facing interface receiving a satisfaction identifier and consent gating for initiating a satisfaction workflow. In some aspects, the overall environment 300 may be rendered as a responsive web page or native application screen that may establish session state for subsequent validation by a service layer and a persistence-backed satisfaction ledger. In various aspects, the overall environment 300 may synchronize UI state with a server to mitigate reseeding of sensitive disclosures and may surface policy notices emphasizing non-retention of recovery credentials by an source node.

In certain aspects, a Public-facing Interface (onboarding UI) 310 may be configured to collect a satisfaction identifier corresponding to a data object axiom instrument and to acquire user consent including an explicit acknowledgement that recovery credentials are disclosed only ephemerally and are not retained by an source node. In some aspects, the Public-facing Interface (onboarding UI) 310 may initialize a satisfaction workflow responsive to user activation of a continue control, and may package a satisfy initiation payload that may include a session identifier, client fingerprint heuristics, and locale data for formatting. In several aspects, the Public-facing Interface (onboarding UI) 310 may be implemented using a modern front-end framework (for example, React, Vue, Svelte) that may communicate with a public API over mutual-TLS-terminated HTTPS endpoints, for instance.

In some aspects, a Redemption Identifier Input 320 may include one or more input fields tailored for a code pattern such as a hyphenated alphanumeric token, a QR-decoded string, or a short URL deep-link parameter. In various aspects, the Redemption Identifier Input 320 may present validation state by coloring, icons, and ARIA alerts, and may throttle debounce to avoid excessive network lookups. In certain aspects, the Redemption Identifier Input 320 may support paste sanitization, checksum or Luhn-like verification, and masking of sensitive fragments when shared on-screen, for example.

In various aspects, a Consent Control Set 330 may comprise a First Consent Control (terms) 332 and a Second Consent Control (ephemeral disclosure acknowledgement) 334, and may withhold activation of a continue control until both are set once a user agrees. In certain aspects, the First Consent Control (terms) 332 may reference a terms-of-service artifact with hash-stamped versioning, and the Second Consent Control (ephemeral disclosure acknowledgement) 334 may explicitly acknowledge time-limited display and non-recoverability of recovery credentials. In many aspects, the Consent Control Set 330 may record local state and may reflect server-side mirrored gating to ensure that consent state may not be bypassed by client modifications.

In some aspects, a Continue Control 340 may be disabled until the Consent Control Set 330 is satisfied and a syntactically valid satisfaction identifier may be present. In various aspects, the Continue Control 340 may trigger an API call such as POST/satisfy/initiate with a body including the normalized satisfaction identifier, consent flags, and a request to start a CREATED state in a satisfaction state machine. In certain aspects, the Continue Control 340 may handle error returns such as invalid identifier, temporary lockout, or rate-limit feedback by presenting user-readable messages and preserving user inputs for correction, for instance.

In several aspects, a Server-side Validation Mirror 350 may represent backend validation mirroring client gating semantics and may be conceptually tied to a service layer that validates the satisfaction identifier against a satisfaction ledger and orchestrates the workflow. In some aspects, the Server-side Validation Mirror 350 may verify that both consents are present before promoting state from CREATED to VALIDATED, may issue a satisfy command to a service layer, and may return an idempotent session token to bind subsequent steps. In various aspects, the Server-side Validation Mirror 350 may refuse reseeding of any recovery credentials once a countdown has expired in later phases, and may persist only non-secret metadata.

In some aspects, User Identity Inputs (optional) 360 may be provided to capture optional PII such as name or date of birth where local policy or risk-based controls warrant, which may support anti-spoofing controls including rate limiting, temporary lockout upon repeated failures, IP or device fingerprint heuristics, short-lived one-time-password (OTP) verification, and geo policy checks. In various aspects, the User Identity Inputs (optional) 360 may be hidden by default and conditionally displayed where spoofing signals (i.e. fraud signals), or regulatory requirements may justify additional friction. Preferably, the User Identity Inputs (optional) 360 may be validated locally for format and transmitted to the service layer only upon explicit submission.

In certain aspects, an Ephemeral Policy Notice 370 may be displayed as a UI notice that reminds the user of a platform policy that recovery credentials may not be retained in server-side storage or logs and may only be disclosed ephemerally within a later disclosure viewport. In some aspects, the Ephemeral Policy Notice 370 may clarify that clipboard export may be disabled until a user confirms offline storage and that recovery credentials may be zeroized upon timer expiry with no subsequent disclosure, which may align with later time-limited display and non-reseeding semantics.

In various aspects, the Public-facing Interface (onboarding UI) 310 may integrate accessibility affordances such as ARIA roles, keyboard navigation for the Consent Control Set 330, and high-contrast themes to ensure visibility of validation states for the Redemption Identifier Input 320. In some aspects, the Public-facing Interface (onboarding UI) 310 may incorporate content security policies to reduce risk of data exfiltration, may disable third-party analytics on screens where sensitive transitions occur, and may obfuscate identifiers in any client logs.

In certain aspects, the overall environment 300 may coordinate with a service layer to begin a satisfaction state machine at CREATED upon the Continue Control 340, transition to VALIDATED upon identifier acceptance, and later to SIGNED and BROADCAST when another service layer constructs and cryptographically signs a transfer and a network broadcast interface submits it to a blockchain network. Multiple blockchain networks are also supported. In several aspects, gating of a transaction identifier may be deferred until a blockchain-accepted state is detected, which may be reflected in later figures and subsequent UI pages rather than the onboarding screen shown here.

In some aspects, error handling within the overall environment 300 may include descriptive messages for mismatched identifier formats, expired axiom instruments, or temporary lockouts due to repeated attempts. In various aspects, the Continue Control 340 may present backoff timers, a link to consult support, or instructions for retry windows without revealing internal fraud thresholds. Preferably, the Ephemeral Policy Notice 370 may remain visible regardless of error state to maintain clarity regarding non-retention and time-limited disclosure.

In several aspects, network considerations for the Public-facing Interface (onboarding UI) 310 may include mutual TLS termination at an edge, strict same-origin policies, and use of short-lived CSRF tokens when the Continue Control 340 posts a satisfy initiation. In some aspects, the Server-side Validation Mirror 350 may sign response envelopes to the client with detached signatures or include HMACs to authenticate payload integrity before the interface navigates to the next step.

In certain aspects, the Redemption Identifier Input 320 may be populated via query-string deep link, a camera-based QR scan, or manual entry. In many aspects, deep-linking may prefill the field while still requiring the Consent Control Set 330 to be satisfied before enabling the Continue Control 340. In other aspects, QR scanning may run entirely on-device without uploading imagery, extracting only the token string used in the same validation pipeline. Preferably, client reloads may not bypass the Server-side Validation Mirror 350, which may treat any missing consent flags as a validation failure.

In various aspects, the First Consent Control (terms) 332 may surface a link to a terms document and a privacy notice, and the Second Consent Control (ephemeral disclosure acknowledgement) 334 may include a succinct statement that recovery credentials may be disclosed only ephemerally within a countdown-driven viewport and may not be persisted. In some aspects, the Consent Control Set 330 may provide tooltips that define "ephemeral disclosure," "recovery credentials," and "non-reseeding" in lay terms, while maintaining internal mappings to the service layer vocabulary.

In certain aspects, the overall environment 300 may be adapted for multiple data object networks by parameterizing network identifiers and asset glyphs while keeping the Consent Control Set 330 semantics consistent. In several aspects, a locale subsystem may adjust date and number formats for the User Identity Inputs (optional) 360 when present, while the Redemption Identifier Input 320 may use a strict ASCII regime to prevent homoglyph confusion. In some aspects, rate limiting associated with the Server-side Validation Mirror 350 may be tuned per-ASN or per-device fingerprint to reduce abuse, for instance.

In various aspects, auditability of consent acquisition may be achieved by cryptographic hashing of consent selections and timestamps on the server side, while the Public-facing Interface (onboarding UI) 310 may display a compact receipt indicator after the Continue Control 340 is pressed. Preferably, the Ephemeral Policy Notice 370 may reference a policy identifier or version number so that users and reviewers may later correlate which non-retention policy applied at the time of satisfaction.

In some aspects, the onboarding flow depicted in the overall environment 300 may conclude by routing the user to a secure page for ephemeral disclosure, at which time a countdown timer may begin only after the server indicates a valid session and a satisfy command has been issued to a service layer. In various aspects, if the Server-side Validation Mirror 350 returns a pending status, the Public-facing Interface (onboarding UI) 310 may display an interstitial status rather than prematurely rendering any sensitive materials.

In certain aspects, the Public-facing Interface (onboarding UI) 310 may integrate with assistive step-by-step guidance such as a brief explainer modal describing how the recovery credentials may later be used to import a container into compatible applications, while taking care not to reveal any credential content in this initial screen. In some aspects, configuration controls may allow administrators to toggle visibility of the User Identity Inputs (optional) 360 and adjust the wording of the Ephemeral Policy Notice 370 to align with jurisdictional requirements without altering underlying non-retention behavior.

In several aspects, telemetry from the overall environment 300 may exclude sensitive fields and may capture only coarse-grain signals like UI load events or consent toggles set to true, and such telemetry may be disabled entirely for privacy-preserving builds. Preferably, any on-device storage may avoid writing the satisfaction identifier to persistent storage prior to submission; session storage may be cleared when navigation occurs, for example.

In some aspects, styling and UX of the Public-facing Interface (onboarding UI) 310 may communicate the sequential nature of the process by ordering the Redemption Identifier Input 320 above the Consent Control Set 330, and by enabling the Continue Control 340 only when both portions are complete. In various aspects, keyboard focus management may automatically move from the Second Consent Control (ephemeral disclosure acknowledgement) 334 to the Continue Control 340 to minimize user error, and screen-reader labels may describe the consequences of ephemeral disclosure succinctly.

In certain aspects, extensibility of the overall environment 300 may include adding alternative sign-in gates such as short-lived OTP fields when the service layer policy may require extra validation, while ensuring optional inputs do not become mandatory in the absence of policy triggers. In some aspects, the Server-side Validation Mirror 350 may require proof-of-work or a CAPTCHA challenge when abuse is detected, and the Public-facing Interface (onboarding UI) 310 may render these controls conditionally without changing the semantics of consent gating, for instance.

In several aspects, this FIG. 3 environment may prepare the foundation for later processes that may include container key material generation, transaction construction and signing, network broadcast, and an ephemeral disclosure module. In some aspects, the onboarding screen may be deliberately free of any recovery credential content and may act solely as the gateway to a controlled, auditable, and policy-bound satisfaction flow, while recording only non-secret state on the server and client to preserve privacy and security posture.

Referring to FIG. 4, an overall environment 400 may depict an overall backup (having backup format options) and confirmation interface context where an ephemeral disclosure module may present recovery credentials within a disclosure viewport while rendering a countdown timer and, upon expiry, may zeroize the recovery credentials and prevent subsequent disclosure. In some aspects, the overall environment 400 may be delivered from a public-facing interface following validation by a service layer and issuance of a satisfy command to another service layer, such that sensitive materials are rendered only once server-side gating may confirm eligibility and session state. In various aspects, the overall environment 400 may load with non-secret placeholders until a blockchain-accepted or other gating criterion may be satisfied for transaction metadata visibility, while the recovery credentials may be independently governed by the ephemeral timer.

In certain aspects, an Ephemeral Disclosure Viewport 410 may render a bordered panel that may include the recovery credentials, the countdown timer, and user affordances subject to secure-copy gating. In some aspects, the Ephemeral Disclosure Viewport 410 may be implemented as a modal or full-page region with a distinct background and an overlay layer to reduce accidental navigation. In various aspects, the Ephemeral Disclosure Viewport 410 may be configured to prevent screenshots or surface a policy reminder when platform capabilities may allow, may obscure on blur events, and may hide content when the tab or application may be backgrounded, for instance.

In some aspects, a Countdown Timer 412 may display a remaining visibility period (for example, in minutes and seconds) and may be non-resettable via page reload. In various aspects, the Countdown Timer 412 may derive its start and remaining values from server-provided timestamps to prevent local manipulation and may synchronize periodically to correct client drift. Preferably, the Countdown Timer 412 may trigger immediate zeroization of on-screen recovery credentials at expiry and may cause the service layer to refuse reseeding the same credentials upon subsequent requests within the same or a new session.

In certain aspects, Recovery Credentials (mnemonic) 420 may present an ordered mnemonic list that may be generated under a BIP-39 standard, though other mnemonic standards may be used. In some aspects, the Recovery Credentials (mnemonic) 420 may show index numerals to emphasize order, may present words in one or more columns, and may support localized wordlists where permitted. In various aspects, the Recovery Credentials (mnemonic) 420 may be visually masked until a user explicitly reveals them (for example, "click to reveal") to reduce shoulder-surfing risk, and the reveal action may be logged as a non-secret event while avoiding any persistence of the words themselves. In several aspects, a Secure-Copy Control 422 may be displayed as a disabled copy action until a user may confirm offline storage of the Recovery Credentials (mnemonic) 420, thereby enforcing a secure-copy control that may disable clipboard export until receipt of user confirmation. In some aspects, the Secure-Copy Control 422 may copy words to a volatile clipboard buffer with automatic expiration and may display a warning banner indicating that clipboard contents may be accessible by other applications. In various aspects, the Secure-Copy Control 422 may be entirely disabled by policy or device constraints and may instead provide instructions for manual transcription, for instance.

In some aspects, a Machine-Readable Payload (generic code) 430 may be shown as a generic scannable/importable code that may encode at least one of: a raw private key corresponding to a destination address, a single-use claim token bound to the destination address and a time-to-live, or an import descriptor for a hierarchical deterministic container. In various aspects, the Machine-Readable Payload (generic code) 430 may be cryptographically bound to the same destination address defined by container key material and may include a signature or checksum to detect tampering. Preferably, the Machine-Readable Payload (generic code) 430 may be watermarked with a session-bound nonce such that exfiltration screenshots may be traceable without embedding any sensitive user identity.

In certain aspects, a Transaction Metadata Panel 440 may display transaction identifier, destination address, and amount once server-side gating may indicate that a blockchain-accepted state may be reached or other configured threshold may be satisfied. In some aspects, the Transaction Metadata Panel 440 may format the destination address using a human-readable address encoding format compliant with a segregated-witness address specification and may include copy-safe interactions that do not alter the on-chain semantics. In various aspects, the Transaction Metadata Panel 440 may include fee-rate or timestamp information as optional fields when available from the service layer, for instance.

In some aspects, an Explorer Verification Control 442 may open an independent external blockchain-explorer endpoint in a new tab or application context, enabling the recipient to verify the transaction identifier and destination address independently. In various aspects, the Explorer Verification Control 442 may defer activation until a blockchain-accepted state may be detected, and may offer multiple explorer endpoints to reduce reliance on a single external provider. Preferably, the Explorer Verification Control 442 may include a signed deep-link parameter verifying that the transaction identifier has been disclosed by the service layer, without disclosing any other sensitive data.

In certain aspects, a Non-Retention Policy Indicator 450 may provide a clear visible indication that recovery credentials may not be persisted in server-side storage or logs, including exclusion from application logs, access logs, analytics events, or backups. In some aspects, the Non-Retention Policy Indicator 450 may link to a policy version or audit page confirming the non-retention posture and the zeroization semantics. In various aspects, the Non-Retention Policy Indicator 450 may remain visible even after the countdown expiry to remind users why the credentials cannot be re-disclosed.

In several aspects, operational flow across the overall environment 400 may include receiving session context from the service layer indicating that validation has occurred, rendering the Recovery Credentials (mnemonic) 420 and Machine-Readable Payload (generic code) 430 in the Ephemeral Disclosure Viewport 410, and beginning the Countdown Timer 412. In some aspects, the secure-copy gating model may gate the Secure-Copy Control 422 until a user check or confirm action is recorded; the service layer may mirror this gating and may prevent disclosure of the Transaction Metadata Panel 440 until a blockchain-accepted state may be reached. In various aspects, the Non-Retention Policy Indicator 450 may also signal that re-authentication after expiry may not resurface the Recovery Credentials (mnemonic) 420.

In some aspects, software implementation details for the Ephemeral Disclosure Viewport 410 may include a client component that may subscribe to a server-sent events stream or a WebSocket channel for countdown synchronization and state transitions, with graceful fallback to periodic REST polling. In various aspects, the Recovery Credentials (mnemonic) 420 may be held in memory-only variables and may avoid serialization to disk; the component may implement on-blur masking and on-expiry zeroization by overwriting buffers and revoking references. Preferably, the Machine-Readable Payload (generic code) 430 renderer may draw the code using a canvas element without caching an underlying string beyond the lifetime of the countdown.

In certain aspects, the Transaction Metadata Panel 440 may parse server-provided transaction metadata and may present a transaction identifier abbreviated with copy-on-click to minimize transcription errors. In some aspects, the Transaction Metadata Panel may provide a destination address that may correspond to a Segregated Witness format generated from container key material, and the Explorer Verification Control 442 may open a new context with that identifier pre-filled. In various aspects, if a blockchain-accepted state may not be reached within a timeout, the panel may present a neutral pending message and a retry affordance without revealing internal node endpoints, for instance.

In some aspects, the overall environment 400 may include safeguards such as disabling right-click save on the Ephemeral Disclosure Viewport 410, limiting DOM inspection by obfuscation, and presenting an interstitial warning when screen capture may be attempted, noting that such measures may not be fully preventative and may vary by platform. In various aspects, the Countdown Timer 412 may be visually emphasized as the uppermost element to set user expectations, while the Non-Retention Policy Indicator may use persistent text so that policy language may remain visible regardless of viewport scrolling.

In certain aspects, alternative embodiments may present multisignature participant materials within the Ephemeral Disclosure Viewport 410, where the Recovery Credentials (mnemonic) 420 may include multiple participant keys or descriptors sufficient for restoration. In some aspects, the Machine-Readable Payload (generic code) 430 may encode an import descriptor or a miniscript policy string rather than a single raw private key or claim token. In various aspects, the Secure-Copy Control 422 may present a multi-acknowledgement workflow requiring the user to confirm that all cosigner materials may be recorded offline prior to enabling any clipboard interaction.

In several aspects, accessibility and internationalization may be supported by providing the Recovery Credentials (mnemonic) 420 in a selectable text mode with screen-reader annotations that respect the secure-copy gating and do not read content aloud until explicit consent. In some aspects, the Ephemeral Disclosure Viewport 410 may offer a high-contrast mode and an enlarged font option, while the Machine-Readable Payload (generic code) 430 may be rendered with increased module size for low-vision users. Preferably, the Explorer Verification Control 442 may supply localized explorer endpoints where appropriate, without changing the underlying transaction semantics.

In some aspects, resiliency behaviors may include persisting only non-secret state such as countdown start time and session identifiers on the server, while instructing the client to zeroize on any fatal rendering error or disconnection event. In various aspects, the service layer may refuse reseeding after expiry, and the Ephemeral Disclosure Viewport 410 may present guidance for container restoration using the recorded Recovery Credentials (mnemonic) 420 or Machine-Readable Payload (generic code) 430 if retained by the user offline, for instance. Preferably, the Non-Retention Policy Indicator 450 may present post-expiry messaging that clarifies why the credentials cannot be retrieved again.

In certain aspects, user education may be provided within the overall environment 400 to describe how to safely store the Recovery Credentials (mnemonic) 420, including writing on paper or using metal backup plates, and to warn that screenshots or cloud notes may not be safe. In some aspects, the Secure-Copy Control 422 may include a checklist confirmation (for example, "I wrote down all words in order") before enabling any copy functionality, and may disable again if the Countdown Timer 412 may be near expiry to reduce partial captures. In various aspects, post-expiry, the Transaction Metadata Panel may remain visible to allow independent verification while recovery credentials may not be re-disclosed.

In several aspects, integration with the service layer may allow the Transaction Metadata Panel 440 to reflect state transitions such as BROADCAST and BLOCKCHAIN-_ACCEPTED, while the Ephemeral Disclosure Viewport 410 may operate independently of on-chain propagation. In some aspects, the Machine-Readable Payload (generic code) 430 may incorporate a policy tag indicating whether the payload may be a claim token or a raw key; if a claim token may be used, the Explorer Verification Control 442 may not be necessary to confirm key-to-address binding because the token may embed a signed address mapping. In various aspects, when a raw private key may be displayed, the system may verify that the key decodes to the destination address before rendering any transaction metadata, for instance.

In certain aspects, secure-print or export pathways may be disabled in the overall environment 400 unless an administrator mode may allow a controlled printer with no spooling to persistent storage. In some aspects, the Non-Retention Policy Indicator 450 may include a brief summary of audit assurances indicating that no server-side storage or logs may persist recovery credentials, including exclusion from application logs, access logs, analytics events, or backups. In various aspects, an administrator build may expose proof points (for example, signed attestation statements) without altering the behavior of the Ephemeral Disclosure Viewport 410.

In some aspects, session termination may occur immediately upon Countdown Timer 412 expiry, or after a grace interval during which only non-secret Transaction Metadata Panel 440 content may remain visible. In various aspects, the session may be invalidated server-side to block subsequent disclosure requests; the client may be instructed to navigate back to a safe landing screen with step-by-step guidance on next steps for container import. Preferably, the Ephemeral Disclosure Viewport 410 may fade or blur content during zeroization to communicate finality without revealing any sensitive pixels.

In several aspects, the overall environment 400 may be extensible to support assets beyond Bitcoin-like (any cryptocurrency) UTXO networks by adapting the Transaction Metadata Panel 440 semantics and the Machine-Readable Payload (generic code) 430 format while preserving the core ephemeral disclosure model. In some aspects, the Recovery Credentials (mnemonic) 420 may represent a seed for derivation paths compliant with BIP-44, BIP-49, BIP-84, or BIP-86, though other derivation schemes may be used. In various aspects, those derivation specifics may be referenced in educational text outside of the Ephemeral Disclosure Viewport 410 to avoid implying mandatory parameters to end users.

In certain aspects, the overall environment 400 may coordinate with mobile platforms to honor system-level privacy indicators, such as hiding content from app switchers and preventing predictive text or keyboard logging when the Recovery Credentials (mnemonic) 420 may be visible. In some aspects, the Secure-Copy Control 422 may be conditioned on platform capabilities; if the platform clipboard may not provide reliable ephemeral buffers, the control may remain disabled and the UI may guide users to manual backup. In various aspects, the Explorer Verification Control 442 may deep link to installed container applications for in-app verification, provided that such linking may not transmit any recovery credentials.

In various aspects, the Explorer Verification Control 442 may deep link to installed container applications for in-app verification, provided that such linking may not transmit any recovery credentials. It shall be noted that the methods and systems described herein, for instance as embodied in the overall environment 400, may be used across a variety of industry and technological domains beyond consumer axiom instruments. For example, in international remittances, the system may be used to provide a low-cost and near-instantaneous method for sending value across borders directly to a recipient who may not have access to traditional banking, with the recipient gaining full self-custody upon satisfaction. Furthermore, in humanitarian aid and disaster relief, the system may be used by non-governmental organizations to distribute funds securely and efficiently to affected populations, providing a resilient means of value transfer that does not depend on local banking infrastructure. In other aspects, corporations may use the system for payroll or contractor payments in crypto-native industries, or for global rewards and incentive programs, ensuring recipients have immediate and direct control over their earnings.

The systems, apparatus and methods described, for instance in the overall environment 400, result in many technical benefits over conventional data object distribution techniques. Firstly, unlike conventional techniques that rely on creating custodial accounts for recipients, the disclosed system may mitigate counterparty risk and reduce the source node's regulatory and security burden by programmatically transitioning full self-custody to the recipient. In some aspects, the source node may be an issuer. The ephemeral disclosure process, enforced by the Countdown Timer 412 and the Non-Retention Policy Indicator 450, ensures that the source node's computer systems do not become a centralized repository or "honeypot" for private key material, which is a significant technical improvement in security posture over systems that persist user keys in server-side databases.

Secondly, in some embodiments, the system lowers the technical barrier to entry for receiving data objects, thereby improving the accessibility of the underlying blockchain technology. Conventional methods often require a recipient to have a pre-existing container and a high degree of technical sophistication to generate and secure recovery credentials before a transfer can even be initiated. The disclosed method, as illustrated in FIG. 4, provides a guided, just-in-time container provisioning workflow that delivers Recovery Credentials (mnemonic) 420 and a Machine-Readable Payload (generic code) in a single, secure, and user-friendly session. This automated provisioning process makes the technology accessible to a broader range of users who may be new to data objects.

Thirdly, the system may enhance trust and transparency through verifiable on-chain settlement. By providing a Transaction Metadata Panel 440 and an Explorer Verification Control 442, the recipient is technically empowered to independently verify the transfer of assets on the public blockchain ledger. This is a technical improvement over opaque, off-chain ledger systems where the user must trust the provider's internal accounting and has no independent means of verifying that the assets have actually been allocated. Finally, the inclusion of a Secure-Copy Control 422 that is programmatically gated by user confirmation provides a specific technical mechanism to encourage and enforce best practices for offline storage, a feature absent in methods that passively display credentials without interactive safeguards.

In some aspects, a residue-based data object network, as referenced herein, may be understood to be mathematically equivalent to a residue-based data object network. The term 'residue,' in the context of modular arithmetic, may refer to the remainder left after an integer is divided by a modulus. For instance, the integer 17 divided by 5 yields a quotient of 3 and a residue of 2, which is the fundamental component carried forward for subsequent calculations within that modular system. In a parallel manner, a transaction on a residue-based network may consume a discrete, unspent transaction output (residue) as an input, which itself is a residue from a prior transaction. The transaction operation may direct a portion of the input value to a recipient and may direct the remaining value back to the sender as a new, unspent output. This new residue, or leftover component, functions precisely as the residue of the transaction. It is this unspent, leftover component that must be used as an input for a subsequent operation. Therefore, the terms 'residue' and 'remainder' may be used as mathematically synonymous nouns for a residue, and a 'residue-based data object network' may refer to a system where value is tracked as a collection of these discrete, unspent remainders from completed operations, which are carried forward to be used in subsequent operations. Further, the 'data object network' may be one of several digital asset networks in which hashing occurs in order to enable network communications.

Figure 5:
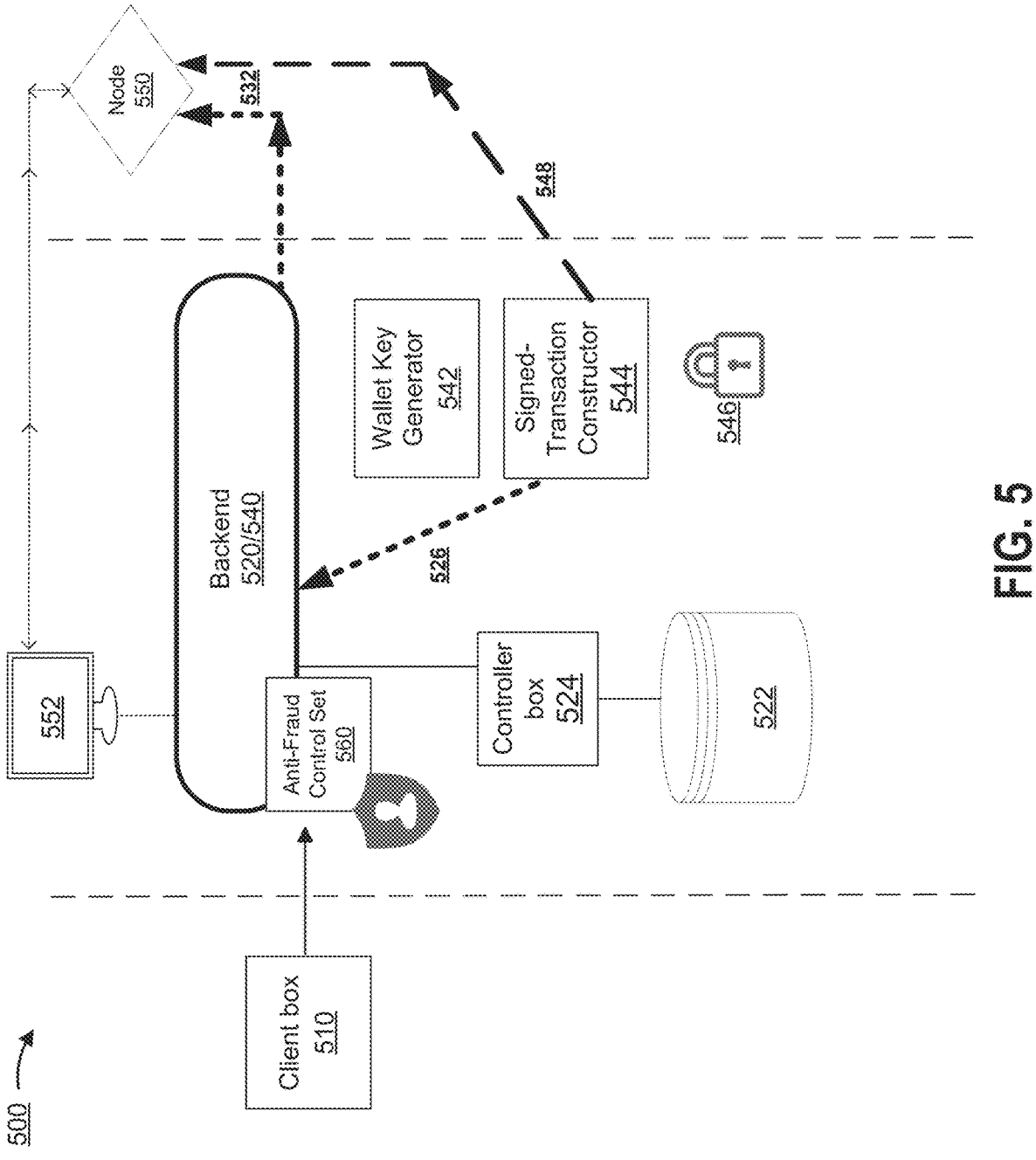
FIG. 5 is a service-side system architecture with distinct service layers for orchestrating a satisfaction workflow.

Referring to FIG. 5, an overall environment 500 may illustrate a system architecture overview connecting a client web tier, a service orchestration tier, a service signing tier, a persistence-backed satisfaction ledger, and a network broadcast interface used to submit signed transfers to a blockchain node (on-chain transfer). In some aspects, the overall environment 500 may be deployed across segmented networks with strict ingress rules and mutual authentication to separate public-facing logic from cryptographic signing operations. In various aspects, the overall environment 500 may be implemented using containerized services with infrastructure-as-code for reproducibility, blue/green rollouts for minimal downtime, and observability that may exclude sensitive data.

In certain aspects, a Web Application 510 may be a browser-based UI or a native client that may communicate with a service layer to receive a satisfaction identifier, acquire user consent that recovery credentials are disclosed ephemerally and not retained, and initiate a satisfaction workflow. In some aspects, the Web Application 510 may be written in a high-level framework such as React or Vue and may call JSON/REST or gRPC endpoints over TLS, with CSRF and content-security policies applied. In various aspects, the Web Application 510 may be responsible for rendering a consent control set and a countdown-driven disclosure viewport as described with respect to other figures while deferring validation and orchestration to server components.

In some aspects, a Service Layer (orchestrator) 520 may be public and may validate the satisfaction identifier against a satisfaction ledger, may orchestrate the satisfaction workflow, and may issue a satisfy command to a service layer. Preferably, the Service Layer (orchestrator) 520 may include a routing gateway, an application service responsible for state machine transitions (CREATED, VALIDATED, SIGNED, BROADCAST, BLOCKCHAIN_ACCEPTED), and policy middleware for anti-spoofing and idempotency. In various aspects, the Service Layer (orchestrator) 520 may expose a limited set of endpoints (for example, initiate, validate, status, finalize) and may return only non-secret metadata to the Web Application 510.

In certain aspects, a Redemption Ledger 522 may include data structures and/or tables that may persist instrument identifiers, code status, issuance metadata, user session bindings, and satisfaction states. In some aspects, the Redemption Ledger 522 may be normalized across tables for instruments, users, and satisfies, or may be implemented as an append-only event log with snapshots to reconstruct state machines. In various aspects, the Redemption Ledger 522 may store transaction identifiers, destination addresses, timestamped state transitions, and may explicitly omit any recovery credentials to uphold non-retention policy.

In some aspects, an Idempotency/Session Controller 524 may manage unique session identifiers tied to a satisfy attempt and may reject duplicate finalization attempts. In various aspects, the Idempotency/Session Controller 524 may assign deterministic idempotency keys to POST operations and may lock a satisfaction record on first success to prevent race conditions across multiple client requests. Preferably, the Idempotency/Session Controller 524 may serialize state transitions so CREATED may precede VALIDATED, and any attempt to repeat finalization after SIGNED may be refused.

In certain aspects, a Public-Tier Broadcast Relay Path 526 may represent an architecture option wherein the public tier may submit signed transfers to a network broadcast interface while retaining no private keys or signing capability. In some aspects, the Public-Tier Broadcast Relay Path 526 may be used when the service returns a fully signed transaction (e.g., PSBT finalized or raw hex) and the public tier may perform resilient retries and endpoint failover. In various aspects, the Public-Tier Broadcast Relay Path 526 may be accompanied by a Public-to-Node Submission 532 that may convey the transaction to a node RPC or relay endpoint, returning a transaction identifier and acceptance status to the Service Layer (orchestrator) 520.

In some aspects, a Network Broadcast Interface 530 may be a component or API used to submit signed transfers to a blockchain network. In various aspects, the Network Broadcast Interface 530 may include node RPC clients, fee-estimation readers, and backoff/failover logic to alternate endpoints. Preferably, the Network Broadcast Interface may provide a uniform result schema including transaction identifier, relay acceptance flags, and optional error codes, which the Service Layer (orchestrator) 520 may translate into state transitions.

In certain aspects, a Service Layer (signing tier) 540 may be private and may be isolated from public ingress and may be communicatively coupled to the Service Layer (orchestrator) 520 via mutually authenticated channels. In some aspects, the Service Layer (signing tier) 540 may accept a satisfy command containing a validated amount, destination derivation parameters, and policy hints (e.g., dust threshold, RBF flag), and may return signed transfer artifacts and a destination address. In various aspects, the Service Layer (signing tier) 540 may run on hardened hosts or within dedicated VPC segments with strict egress controls, for instance.

In some aspects, a Wallet Key Generator 542 may create key material and define a destination address for the funding transfer. In various aspects, the Wallet Key Generator 542 may derive keys from a mnemonic generated under BIP 39 and a derivation path compliant with BIP 44, BIP 49, BIP 84, or BIP 86, or may construct multisignature descriptors for M of N as an optional embodiment. Preferably, the Wallet Key Generator may output a public import descriptor or a destination address for use by the Service Layer (orchestrator) 520 while keeping seed and private keys within the Service Layer (signing tier) 540.

In certain aspects, a Signed-Transaction Constructor 544 may build and cryptographically sign a transfer directed to the destination address. In some aspects, the Signed-Transaction Constructor 544 may assemble a Segregated Witness PSBT for a residue network, sign using ECDSA over secp256k1 with deterministic nonces per RFC 6979, compute fees based on network mempool conditions, estimating a dynamic network communications penalty based on network mempool conditions, and enforce a dust threshold for change outputs with optional replace-by-fee enablement. In various aspects, the Signed-Transaction Constructor 544 may return either a fully signed raw transaction for immediate broadcast or a PSBT that may be finalized by another trusted internal module, depending on policy.

In some aspects, a Hardware-Backed Key Vault 546 may be used by the Service Layer (signing tier) 540 to protect key material and perform signing operations. In various aspects, the Hardware-Backed Key Vault 546 may include an HSM, a cloud KMS with asymmetric signing APIs, and/or a threshold signing module that may split authority across multiple cryptographic participants. Preferably, the Hardware-Backed Key Vault may restrict key export, rate-limit signing requests, and may require quorum authorization events for critical operations.

In certain aspects, a Private-Tier Direct Broadcast Path 548 may represent an alternative where the Service Layer (signing tier) 540 may directly submit a signed transfer to the Network Broadcast Interface 530 without traversing the public tier for the broadcast step. In some aspects, the Private-Tier Direct Broadcast Path 548 may reduce attack surface by preventing signed payload exfiltration to public networks and may receive the transaction identifier directly from the Blockchain Node 550. In various aspects, selection between Public-Tier Broadcast Relay Path 526 and Private-Tier Direct Broadcast Path 548 may be configurable per deployment or per satisfy policy.

In some aspects, a Blockchain Node 550 may be an endpoint used for propagation and status monitoring. In various aspects, the Blockchain Node 550 may be self-hosted to preserve policy control or may be an external node provider with authenticated RPC channels. Preferably, the Blockchain Node 550 may expose mempool acceptance signals, fee estimation, and confirmation notifications that downstream components may consume.

In certain aspects, a Mempool and Confirmation Monitoring 552 module may detect mempool acceptance and block confirmations to drive state changes in the satisfaction state machine. In some aspects, the Mempool and Confirmation Monitoring 552 may subscribe to node ZMQ notifications or poll RPCs, updating the Service Layer (orchestrator) 520 so that it may gate surfacing of the transaction identifier (rendering the transaction identifier withheld) and destination address to the Web Application 510 until a BLOCKCHAIN_ACCEPTED state may be reached (detected). In various aspects, retries with exponential backoff and failover to alternate node endpoints may be used upon network failures.

In some aspects, an Anti-Fraud Control Set 560 may include rate limiting, temporary lockout of a satisfaction identifier upon repeated failures, IP or device fingerprint heuristics, short-lived OTP verification, and geo policy checks. In various aspects, the Anti-Fraud Control Set 560 may be applied during validation by the Service Layer (orchestrator) 520 and may conditionally require user identity inputs or second factors before proceeding to a satisfy command. Preferably, the Anti-Fraud Control Set 560 may log only non-sensitive indicators and may avoid storing any recovery credentials or private key material.

In several aspects, operational flow across the overall environment 500 may proceed as follows. The Web Application 510 may send a satisfy initiation containing a normalized satisfaction identifier and consent confirmations to the Service Layer (orchestrator) 520.

The Service Layer (orchestrator) 520 may validate against the Redemption Ledger 522, apply the Anti-Fraud Control Set 560, and create or confirm a session in the Idempotency/Session Controller 524. Upon success, the Service Layer (orchestrator) 520 may issue a satisfy command to the Service Layer (signing tier) 540, which may invoke the Wallet Key Generator 542 and the Signed-Transaction Constructor 544 with the Hardware-Backed Key Vault 546 performing protected signing. The resulting signed transfer may be submitted either through the Public-Tier Broadcast Relay Path 526 and Public-to-Node Submission 532 or via the Private-Tier Direct Broadcast Path 548 to the Network Broadcast Interface 530 and the Blockchain Node 550. The Mempool and Confirmation Monitoring 552 may then drive state transitions visible to the Web Application 510, which may reveal only transaction metadata after BLOCKCHAIN_ACCEPTED while keeping recovery credentials governed by a separate ephemeral disclosure module in another figure.

In certain aspects, software implementation choices may include stateless microservices for the Service Layer (orchestrator) 520, ACID-compliant storage or strongly consistent cloud databases for the Redemption Ledger 522, and audited cryptographic modules for the Hardware-Backed Key Vault 546. In some aspects, the Network Broadcast Interface 530 may encapsulate multiple node clients to support failover and may persist minimal non-secret telemetry for operational health. Preferably, deployment may enforce least privilege across services, short-lived service credentials, and continuous verification of configuration integrity.

In various aspects, alternative embodiments may include multisignature workflows wherein the Wallet Key Generator 542 may output participant descriptors and the Signed-Transaction Constructor 544 may assemble partial signatures from distributed signers before finalization. In some aspects, derivation paths may be parameterized per asset family while maintaining a human-readable address encoding compliant with segregated-witness standards where applicable. In certain aspects, the Service Layer (orchestrator) 520 may gate explorer deep links until mempool acceptance, may rotate broadcast endpoints by policy, and may support geographic pinning of nodes for compliance, for instance.

In several aspects, security and privacy posture may be reinforced by keeping recovery credentials out of the Service Layer (orchestrator) 520 and the Redemption Ledger 522 entirely, having the Service Layer (signing tier) 540 return only the destination address and signed transaction data, and using strict data loss prevention policies on log pipelines. In some aspects, audit trails may record non-secret state transitions, session identifiers, and signature attestations from the Hardware-Backed Key Vault 546, while excluding any private key material. Preferably, monitoring and alerts may focus on anomaly detection in request rates, signing frequency, and broadcast failures without capturing payloads that could reveal secrets.

In certain aspects, this FIG. 5 architecture may be adapted to different scale profiles by adding sharded Service Layer (orchestrator) 520 instances, read replicas for the Redemption Ledger 522, and horizontally scaled Network Broadcast Interface 530 pools.

In some aspects, latency-sensitive deployments may prefer the Private-Tier Direct Broadcast Path 548 to reduce hops between the signer and the node, whereas high-availability environments may prefer the Public-Tier Broadcast Relay Path 526 to leverage centralized retry and failover logic. In various aspects, policy toggles may determine which path is used per satisfaction cohort.

Figure 6:
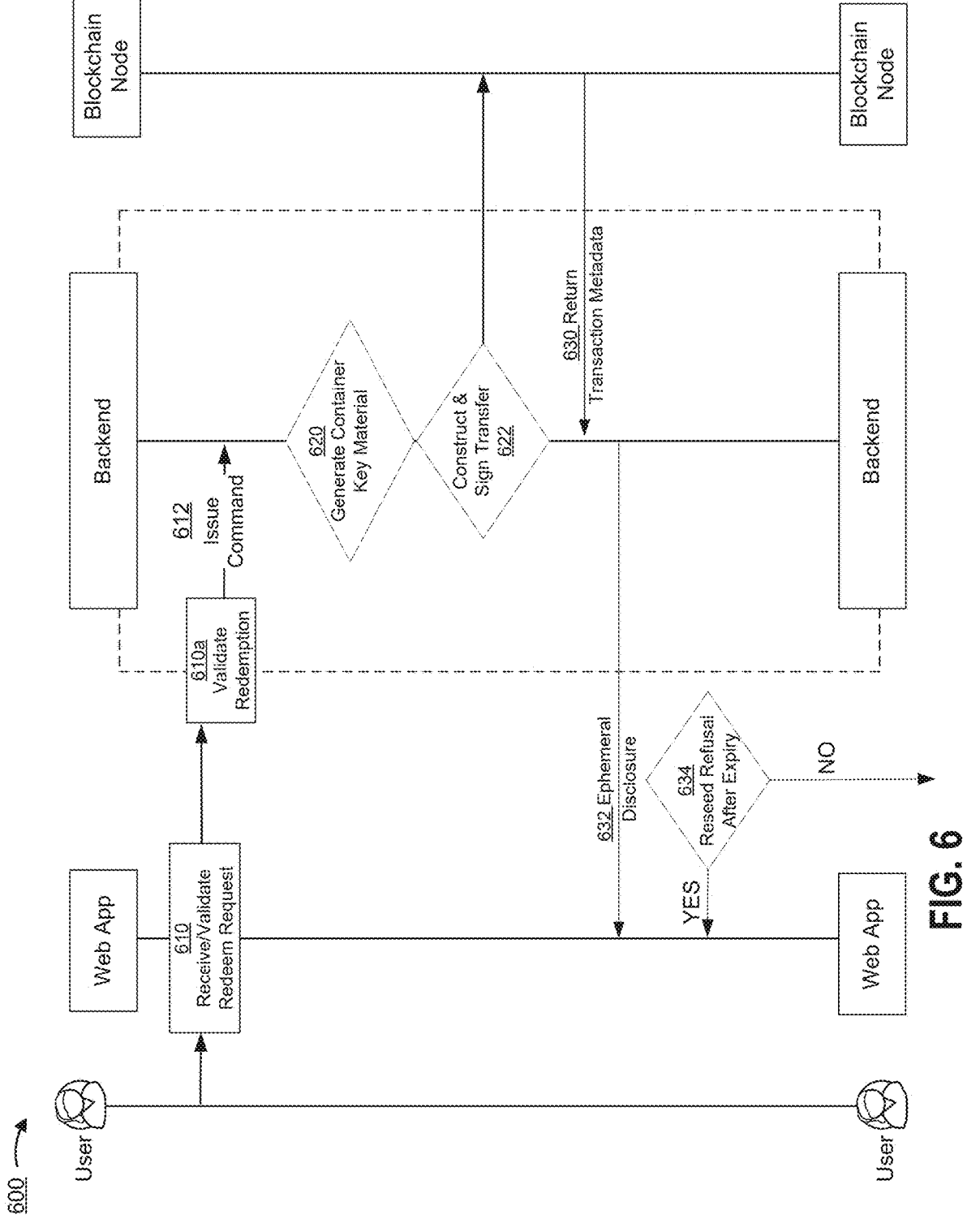
FIG. 6 is a process sequence for container creation and values transfer, illustrating orchestration across client and server tiers.

Referring to FIG. 6, an overall environment 600 may illustrate a process sequence that orchestrates satisfaction across a public-facing interface, a service layer, a service layer, and a blockchain node, with explicit ephemerality and non-retention policies applied to recovery credentials. In some aspects, the overall environment 600 may be realized as a sequence diagram or flow schematic in which each step corresponds to a state transition of a satisfaction state machine; CREATED, VALIDATED, SIGNED, BROADCAST, and BLOCKCHAIN_ACCEPTED may be used to track progression, while secret material may remain confined to protected contexts only.

In certain aspects, a Receive and Validate Redemption 610 may represent service layer validation upon receiving a satisfaction identifier from the public-facing interface. In some aspects, the Receive and Validate Redemption 610 may validate code format, instrument status, and prior satisfaction history against a satisfaction ledger with idempotency controls. In various aspects, anti-spoofing policies may be applied, including rate limiting, temporary lockout on repeated failures, IP or device fingerprint heuristics, short-lived one-time password checks, and geolocation policy. Preferably, the Receive and Validate Redemption 610 may generate or confirm a unique session identifier that may be used to bind subsequent operations and to reject duplicate finalization attempts.

In some aspects, an Issue Redeem Command 612 may depict a command from the unified backend service layer (server-side layer) to commence key generation and signing. In various aspects, the Issue Redeem Command 612 may include normalized value amounts, asset/network identifiers, policy hints for fee strategy and replace-by-fee enablement, and a minimally sufficient destination derivation specification. Preferably, the Issue Redeem Command 612 may be transmitted over mutually authenticated transport with request signing and replay protection.

In certain aspects, a Generate Container Key Material 620 may indicate private-tier generation of container key material defining a destination address. In some aspects, the Generate Container Key Material 620 may derive a seed from a mnemonic generated under BIP 39 and a derivation path compliant with BIP 44, BIP 49, BIP 84, or BIP 86, and may output a corresponding Segregated Witness destination address or, optionally, a Taproot address, depending on policy. In various aspects, multisignature embodiments may construct M of N descriptors, participant xpubs, and script policies, while keeping private components resident within the private tier. Preferably, the Generate Container Key Material 620 may avoid exporting any private key material to the public tier.

In some aspects, a Construct and Sign Transfer 622 may represent private-tier creation and signing of a funding transaction directed to the destination address established at the Generate Container Key Material 620. In various aspects, the Construct and Sign Transfer 622 may assemble a partially signed transaction for a residue-based data object network, sign inputs using ECDSA over secp256k1 with deterministic nonces per RFC 6979, and compute a dynamic fee rate responsive to mempool conditions while enforcing a dust threshold and optional replace-by-fee. Preferably, the Construct and Sign Transfer may produce either a fully signed raw transaction for immediate relay or a finalized PSBT depending on deployment policy, with all sensitive operations confined to cryptographic modules.

In certain aspects, a Broadcast Signed Transfer (not shown) may allow submission of the signed transfer via a network broadcast interface to a blockchain node. In some aspects, the Broadcast Signed Transfer may be executed by a public-tier relay or directly by the private tier, each pathway being selectable by configuration. In various aspects, the Broadcast Signed Transfer may include resilient retry with exponential backoff and failover to alternate node endpoints and may return normalized submission results. Preferably, any failure responses may be recorded as non-secret telemetry sufficient for diagnostics without logging raw transactions in plaintext.

In some aspects, a Return Transaction Metadata 630 may indicate that the service layer returns a transaction identifier, the destination address, and optionally fee or state indicators to the UI for presentation. In various aspects, the Return Transaction Metadata 630 may gate rendering of a transaction identifier to the user until a blockchain-accepted state is detected by node monitoring, thereby avoiding premature disclosure that could confuse status. Preferably, the Return Transaction Metadata 630 may offer explorer-deep-link URIs that the UI may render for independent verification, without exposing any recovery credentials.

In certain aspects, an Ephemeral Disclosure Step 632 may represent the user interface step in which recovery credentials associated with the container key material may be presented within a disclosure viewport while a countdown timer is rendered. In some aspects, the Ephemeral Disclosure Step 632 may display an ordered list with index numerals corresponding to a mnemonic word sequence, as well as a machine-readable payload that may encode at least one of a raw private key bound to the destination address, a single-use claim token with a time-to-live, or an import descriptor, depending on policy. In various aspects, a secure-copy control may disable clipboard export until the user confirms offline storage, and on expiry the UI may zeroize the credentials and may prevent subsequent disclosure requests. Preferably, the Ephemeral Disclosure Step 632 may not commence until the service layer has validated session status and synchronized timer parameters to prevent local manipulation. In various aspects, the system supports printed physical cards or virtual cards or other media, but does not require all these formats.

In some aspects, a Reseed Refusal After Expiry 634 may illustrate server-side refusal to reissue or redisclose recovery credentials following expiration of the countdown timer. In various aspects, the Reseed Refusal After Expiry 634 may be enforced for both authenticated and unauthenticated re-requests, across device sessions, and may survive page reloads by being bound to the server-side session state machine and audit policy. Preferably, the Reseed Refusal After Expiry 634 may be accompanied by step-by-step user guidance explaining restoration using the previously recorded credentials and a reminder that the platform does not retain those credentials in any server-side storage or logs.

In several aspects, the overall environment 600 may define data flows such that the public-facing interface may receive only non-secret metadata from the Return Transaction Metadata 630 and may temporarily process recovery credentials exclusively in volatile client memory during the Ephemeral Disclosure Step 632. In some aspects, the service layer may never store or log any recovery credentials while still recording non-secret state transitions and session bindings to support auditability. In various aspects, the service layer may physically segregate signing infrastructure and may use a hardware-backed key vault for sealed key operations, rate limiting, and authorization quorums when threshold signing policies may be enabled.

In certain aspects, software implementations of the Receive and Validate Redemption 610 and the Issue Redeem Command 612 may be structured as stateless microservices with deterministic idempotency keys to avoid duplicate funding on retries. In some aspects, the Generate Container Key Material 620 and the Construct and Sign Transfer may be hosted in a dedicated virtual network segment with minimal egress, and the Broadcast Signed Transfer may use a hardened network broadcast interface that handles failover without divulging secrets. Preferably, the Return Transaction Metadata 630 may standardize result schemas so downstream UI components may be kept simple and consistent across supported assets.

In some aspects, alternative embodiments of the Ephemeral Disclosure Step 632 may include multisignature participant disclosures or export of descriptors sufficient for restoration in compatible containers, subject to the same countdown and zeroization semantics. In various aspects, a machine-readable payload presented during the Ephemeral Disclosure Step 632 may include digital signatures that bind the payload to the destination address, providing cryptographic assurance of pairing for subsequent imports. Preferably, device features such as screenshot detection or blur-on-background may be optionally enabled to reduce inadvertent leakage while acknowledging platform differences.

In several aspects, the Reseed Refusal After Expiry 634 may integrate with the satisfaction state machine so that further requests for disclosure may be rejected with a terminal status, while non-secret transaction metadata may remain viewable for independent verification. In some aspects, administrators may configure grace rules for re-rendering non-secret panels without lifting restrictions on secret material resurfacing. In various aspects, the overall environment 600 may thus maintain a boundary in which transaction observability and user education may continue while recovery credentials remain unrecoverable by design.

In certain aspects, quality-of-service and resiliency may be improved by monitoring mempool latency and confirmation probabilities and by adaptively tuning fee-rate policies used at the Construct and Sign Transfer 622. In some aspects, status backchannels may include node pub/sub or RPC polling to detect the BLOCKCHAIN_ACCEPTED transition required before populating the Return Transaction Metadata 630. Preferably, the overall environment 600 may log only non-secret metrics sufficient for operations while employing encryption at rest and in transit for all channels carrying sensitive artifacts prior to their ephemeral client-side presentation.

In some aspects, deployment- and policy-level toggles may switch between direct private-tier broadcast at the Broadcast Signed Transfer and a public-tier broadcast relay, while preserving the same gating behaviors at the Return Transaction Metadata 630 and the Ephemeral Disclosure Step 632. In various aspects, different asset types may be supported by selecting derivation paths and address encodings compatible with the asset's segregated-witness specification or equivalent, with the Generate Container Key Material 620 and Construct and Sign Transfer 622 applying the correct primitives. Preferably, the Reseed Refusal After Expiry 634 may be uniformly enforced across all asset families to sustain the non-retention posture.

In various aspects, the overall environment 600 may thus maintain a boundary in which transaction observability and user education may continue while recovery credentials remain unrecoverable by design. In some embodiments, as illustrated in FIG. 6, the process sequence may be implemented within a distributed system of microservices orchestrated by a workflow engine, for example, Cadence or Temporal, which may ensure that state transitions are durable and auditable. For instance, the Receive and Validate Redemption 610 step may trigger a workflow instance that may persist its state in a satisfaction ledger. The Issue Redeem Command 612 may then be dispatched as a durable activity call to the service layer, with built-in retry policies and timeouts. This architecture may allow for graceful recovery from transient failures in downstream services, such as the network broadcast interface or the blockchain node, without requiring manual intervention. The Reseed Refusal After Expiry 634 may be implemented as a terminal state in the workflow, where any subsequent requests for credentials may be rejected by the workflow's state logic without invoking any further service calls.

In several aspects, the Generate Container Key Material 620 may be further configured to support multiple cryptographic curves and address formats to accommodate different data object networks. For example, while a Bitcoin-like asset may use ECDSA over secp256k1, an alternative asset may require EdDSA over Curve25519. The Issue Redeem Command 612 may include a network identifier that may instruct the service layer to select the appropriate cryptographic primitives and derivation schemes. In a multisignature (multisig) embodiment, the Generate Container Key Material 620 may produce output descriptors compliant with standards like PSBTv2, which may include derivation paths for each key, script semantics, and other metadata necessary for a coordinating container to reconstruct the multisig policy and participate in signing.

In certain aspects, the Construct and Sign Transfer 622 may involve a multi-step process where an unsigned transaction is first built, then passed to a hardware-backed key vault for signing. For instance, the service may query a residue provider to select inputs, construct outputs including the destination address and a change address. This may then be passed to an HSM or KMS API, which may return the signed inputs. The service may then finalize the HSM or KMS API, into a fully signed raw transaction. This separation may ensure that the transaction construction logic, which may be more complex and subject to change, does not need to run within the most secure hardware boundary, while the signing keys never leave the vault. In some embodiments, satisfaction state machines may utilize alternate state transitions for handling broadcast failures or RBF scenarios. In various aspects, the Ephemeral Disclosure Step 632 may be implemented as a single-page application component that may receive the recovery credentials and timer parameters via a secure, one-time-use API endpoint. Upon receiving the data, the client-side application may immediately disconnect from the network or cease polling for that specific data to minimize exposure. The zeroization of credentials may be performed by explicitly overwriting the in-memory variables holding the mnemonic and private key data with nulls or random data, and then removing the corresponding DOM elements from the viewport. This client-side logic may be coupled with the server-side Reseed Refusal After Expiry 634 to provide a robust defense-in-depth approach to enforcing the non-retention policy.

Figure 7:
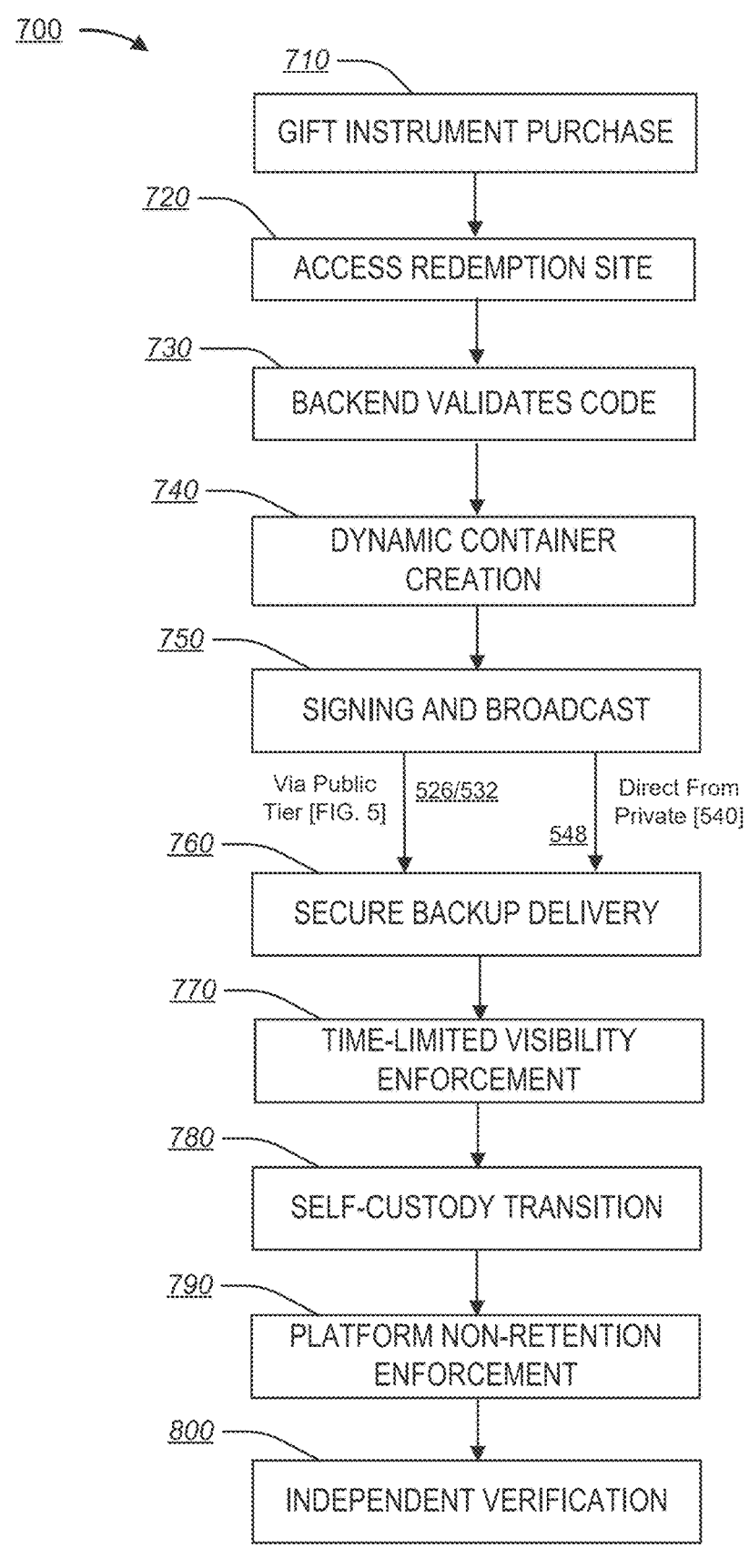
FIG. 7 is a linear flow diagram of an end-to-end purchase-to-satisfaction process, from instrument issuance to self-custody transition.

Referring to FIG. 7, an overall environment 700 may depict a linear purchase-to-satisfaction overview combining business and technical steps that may culminate in self-custody with no server-side persistence of recovery credentials. In some aspects, the overall environment 700 may be implemented as a process diagram that may align with an underlying satisfaction state machine and may illustrate the interplay between a public-facing interface, a service layer, a network broadcast interface, and an external verification path.

In certain aspects, a Gift Instrument Purchase 710 may represent issuance of a unique satisfaction code at a point-of-sale terminal or via an e-commerce storefront. In some aspects, the Gift Instrument Purchase 710 may allocate a data object value to an axiom instrument identifier recorded in a satisfaction ledger, without preloading any private keys or container seeds in the instrument production flow. In various aspects, the Gift Instrument Purchase 710 may include printing a code on physical media or embedding a code in a digital receipt or secure message, while the ledger may mark the instrument as CREATED and unsatisfied.

In some aspects, an Access Redemption Site 720 may depict user navigation to a web application that may act as a public-facing interface configured to receive a satisfaction identifier, acquire user consent including an explicit acknowledgement of ephemeral disclosure and non-retention, and initiate a satisfaction workflow. In various aspects, the Access Redemption Site 720 may enforce a consent control set and may normalize the satisfaction identifier format before transmission to the service layer. Preferably, the Access Redemption Site 720 may transmit only non-secret data at this stage and may not render any recovery credentials.

In certain aspects, a Backend Validates Code 730 may correspond to a service layer validating the satisfaction identifier against a satisfaction ledger and enforcing anti-double-spend/double-satisfy checks. In some aspects, the Backend Validates Code 730 may apply an anti-spoofing control set including rate limiting, temporary lockouts after repeated failures, IP or device fingerprint heuristics, short-lived OTP verification, and geo policy checks. In various aspects, the Backend Validates Code 730 may create or confirm a unique session identifier to ensure idempotency and to bind subsequent orchestration steps.

In some aspects, a Dynamic Container Creation 740 may illustrate that a service layer may create a new container at satisfaction time instead of relying on preloaded containers. In various aspects, the Dynamic Container Creation 740 may generate container key material defining a destination address, which may be derived from a mnemonic generated under BIP 39 and a derivation path compliant with BIP 44, BIP 49, BIP 84, or BIP 86, or equivalent schemes. Preferably, the Dynamic Container Creation may retain all private components within an isolated signing tier and may return only the destination address and metadata required for subsequent transfer construction.

In certain aspects, a Signing and Broadcast 750 may indicate that the service layer may construct and crypto-graphically sign a transfer of data objects directed to the destination address and that a network broadcast interface may submit the signed on-chain transfer to a blockchain network. In some aspects, the Signing and Broadcast 750 may assemble a Segregated Witness partially signed trans-action for a residue-based network, apply ECDSA over secp256k1 with deterministic nonces per RFC 6979, com-pute a dynamic fee rate with an enforced dust threshold, and optionally enable replace-by-fee by policy. In various aspects, the Signing and Broadcast 750 may complete with a transaction identifier available for downstream gating.

In some aspects, a Secure Backup Delivery 760 may depict controlled disclosure of recovery credentials to the user by an ephemeral disclosure module within a disclosure viewport. In various aspects, the Secure Backup Delivery 760 may display the recovery credentials as an ordered list with index numerals and may concurrently display a machine-readable (computer-implemented) payload encod-ing at least one of a raw private key corresponding to the destination address, a single-use claim token bound to the destination address and a time-to-live, or an import descrip-tor. Preferably, a secure-copy control may disable clipboard export until a user may confirm offline storage of the recovery credentials.

In certain aspects, a Time-Limited Visibility Enforcement 770 may provide countdown-based enforcement of limited viewing for the recovery credentials. In some aspects, the Time-Limited Visibility Enforcement 770 may derive its timer from server-provided timestamps and may be non-resettable via reload or re-authentication. In various aspects, upon expiry, the Time-Limited Visibility Enforcement 770 may trigger zeroization of the credentials and may prevent subsequent disclosure attempts, while preserving access to non-secret transaction metadata for status verification.

In some aspects, a Self-Custody Transition 780 may conceptually represent that, after satisfaction and ephemeral disclosure, the user may control spend authority via the revealed recovery credentials without reliance on custodial accounts. In various aspects, the Self-Custody Transition 780 may include user-import steps in compatible container software, while no server component may retain or repro-duce the credentials. Preferably, user education materials may be provided to guide safe storage and restoration practices without embedding any secrets in logs or telem-etry.

In certain aspects, a Platform Non-Retention Enforcement 790 may emphasize policy and technical enforcement ensur-ing no server-side persistence of recovery credentials. In some aspects, the Platform Non-Retention Enforcement 790 may exclude recovery credentials from application logs, access logs, analytics events, backups, and any long-term storage. In various aspects, the Platform Non-Retention Enforcement 790 may cause the service layer to refuse reseeding of recovery credentials after expiry, including across sessions and devices.

In several aspects, the overall environment 700 may support optional variations without departing from the described behavior. In some aspects, Dynamic Container Creation 740 may support multisignature configurations where the ephemeral disclosure may present participant keys or descriptors sufficient for restoration during the count-down. In various aspects, the Signing and Broadcast 750 may be executed by the service layer directly to the network broadcast interface or relayed through the public tier, while monitoring and failover behaviors may be maintained. Pref-erably, Time-Limited Visibility Enforcement 770 and Plat-form Non-Retention Enforcement 790 may remain uniform across supported asset types and deployment profiles to sustain a consistent security posture and user expectation.

While a particular form of the invention has been illus-trated and described, it will be apparent that various modi-fications can be made without departing from the spirit and scope of the invention. For example, the service layer as described in FIG. 5 may be configured to generate multi-signature container key material defining an M-of-N thresh-old, such as for a 2-of-3 threshold container, and the ephemeral disclosure module of FIG. 4 may be adapted to present the multiple participant keys or descriptors required for container restoration during the countdown period. Accordingly, it is not intended that the invention be limited, except as by the appended claims.

Particular terminology used when describing certain fea-tures or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accord-ingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above.

The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A system comprising:
one or more hardware processors;
a public-facing interface configured to receive a satisfaction identifier corresponding to a data object axiom instrument, acquire user consent including an explicit acknowledgement that recovery credentials are disclosed only ephemerally and are not retained by a source node, and initiate a satisfaction workflow;
a server-side layer coupled with the public-facing interface and a persistence layer, the server-side layer configured to validate the satisfaction identifier against a satisfaction ledger comprising stateful records of axiom instruments and to orchestrate the satisfaction workflow including issuance of a satisfy command;
the server-side layer comprising a layer isolated from public ingress and communicatively coupled to the server-side layer, and configured to generate container key material defining a destination address and construct and cryptographically sign a transfer of data objects directed to the destination address;
a network broadcast interface configured to broadcast the transfer to a blockchain network; and
an ephemeral disclosure module configured to, responsive to validation of the satisfaction identifier, present the recovery credentials associated with the container key material within a disclosure viewport while rendering a countdown timer and, upon expiry of the countdown timer, zeroize the recovery credentials and prevent subsequent disclosure, wherein the system enforces a platform policy that the recovery credentials do not persist in server-side storage or logs.

2. The system of claim 1, wherein the server-side layer includes a private service layer utilizing a hardware-backed key vault implementing at least one of: a hardware security module, a cloud key management service, or threshold signing, and authenticates inter-service communications using mutual transport layer security.

3. The system of claim 1, wherein the transfer is a transaction protocol constructed as a partially signed transaction for a residue-based data object network and signed with deterministic nonces.

4. The system of claim 1, wherein the container key material is derived from a mnemonic generated under BIP-39 and a derivation path compliant with at least one of BIP-44, BIP-49, BIP-84, or BIP-86, and
the destination address is encoded using a human-readable address encoding format compliant with a segregated-witness address specification.

5. The system of claim 1, wherein the ephemeral disclosure module enforces a secure-copy control that disables clipboard export of the recovery credentials until receipt of a user confirmation indicating offline storage of the recovery credentials.

6. The system of claim 1, wherein the server-side layer provides, to the public-facing interface, a transaction identifier and
the destination address sufficient for independent verification via an independent external blockchain-explorer endpoint, records a satisfaction state machine comprising at least CREATED, VALIDATED, SIGNED, BROADCAST, and BLOCKCHAIN_ACCEPTED states, and
gates rendering of the transaction identifier until the transfer reaches a blockchain-accepted state.

7. The system of claim 1, wherein the public-facing interface displays the recovery credentials as an ordered list with index numerals and
concurrently displays a machine-readable payload encoding at least one of: a raw private key corresponding to the destination address, a single-use claim token bound to the destination address and a time-to-live, or an import descriptor for a hierarchical deterministic container.

8. The system of claim 1, wherein the server-side layer computes a network communications penalty according to a dynamic fee rate policy derived from network mempool conditions and
enforces a dust threshold for change outputs with replace-by-fee enablement as a policy option.

9. The system of claim 1, wherein the satisfaction ledger enforces idempotency by associating the satisfy command with a unique session identifier and rejecting duplicate finalization attempts.

10. The system of claim 1, wherein the public-facing interface renders a consent control set comprising
a first control to agree to terms and
a second control to acknowledge time-limited disclosure, and
withholds activation of a continue control until both controls are set, and
the server-side layer mirrors a gating via server-side validation.

11. The system of claim 1, wherein the network broadcast interface submits the signed transfer directly from the server-side layer to a blockchain node, and
the server-side layer monitors propagation and confirmation via the node, and
the server-side layer uses retry with exponential backoff and failover to alternate node endpoints upon network failures.

12. The system of claim 1, wherein the server-side layer is further configured to generate multisignature container key material defining an M-of-N threshold, and the ephemeral disclosure module is further configured to disclose, during the countdown, participant keys or descriptors sufficient for container restoration, and the server-side layer does not persist the recovery credentials in any server-side storage or logs, including exclusion from application logs, access logs, analytics events, or backups.

13. The system of claim 1, wherein:

the server-side layer applies anti-spoofing controls comprising at least one of: rate limiting, temporary lockout of the satisfaction identifier upon repeated failures, IP or device fingerprint heuristics, short-lived OTP verification, and geo policy checks;

wherein the public-facing interface renders a timer that is non-resettable via page reload while the server-side layer refuses reseeding after expiry to prevent resurfacing of the recovery credentials responsive to re-authentication.

14. A computer-implemented method for provisioning a local storage container upon satisfaction of an axiom instrument, the method comprising:

receiving, at a public-facing interface, a satisfaction identifier and user consent including an explicit acknowledgement that recovery credentials will be disclosed only ephemerally;

validating, by a public service layer, the satisfaction identifier against a satisfaction ledger and orchestrating a satisfaction workflow including issuing a satisfy command to a private service layer isolated from public ingress;

generating, by the private service layer, container key material defining a destination address and constructing and signing a transfer to the destination address;

broadcasting the signed transfer to a blockchain network and providing, to the public-facing interface, transaction metadata including a transaction identifier and the destination address; and disclosing, by an ephemeral disclosure module responsive to validation of the satisfaction identifier, the recovery credentials under a countdown timer within a disclosure viewport and, upon expiry, zeroizing the recovery credentials, preventing subsequent disclosure requests, and enforcing a platform policy that the recovery credentials do not persist in server-side storage or logs.

15. The method of claim 14, further comprising binding a machine-readable payload to the destination address by at least one of: verifying that a raw private key decodes to the destination address, or cryptographically signing a claim token that encodes the destination address and a time-to-live.

16. The method of claim 14, further comprising estimating a dynamic network communications penalty based on network mempool conditions, enforcing a dust threshold for output selection, and enabling replace-by-fee according to a policy flag.

17. The method of claim 14, further comprising authenticating communications between the public service layer and the private service layer by mutual transport layer security and rate-limiting signing requests at the private service layer.

18. The method of claim 14, wherein the container key material is derived using a mnemonic per BIP-39 and a derivation path per BIP-84 for a native Segregated Witness address, and wherein the destination address is encoded using a human-readable address encoding format compliant with a segregated-witness address specification, and wherein rendering of the transaction identifier is withheld until a blockchain-accepted state is detected.

19. An apparatus comprising one or more processors and non-transitory memory storing instructions that, when executed by the one or more processors, cause the apparatus to:

implement a public-facing interface to receive a satisfaction identifier;

acquire user consent including an acknowledgement of time-limited disclosure of recovery credentials;

initiate a satisfaction workflow based on acquiring the user consent, validate the satisfaction identifier against a satisfaction ledger using a server-side layer; and orchestrate the satisfaction workflow, wherein the satisfaction workflow includes:

issuance of a satisfy command, the server-side layer isolated from public ingress to generate container key material defining a destination address and to construct and sign a transfer of data objects to the destination address, a network broadcast interface to broadcast the signed transfer to a blockchain network, and an ephemeral disclosure module, responsive to validation of the satisfaction identifier, to render the recovery credentials within a disclosure viewport under a countdown timer which, upon expiry, zeroize the recovery credentials and block subsequent disclosure;

wherein the apparatus enforces a platform policy that the recovery credentials do not persist in server-side storage or logs.

20. The apparatus of claim 19, wherein the instructions further cause the apparatus to display, with the recovery credentials, an ordered list with index numerals and a machine-readable payload that is cryptographically bound to the destination address, and wherein the server-side layer does not persist the recovery credentials in any server-side storage or logs.

* * * * *